US012625871B1

(12) United States Patent (10) Patent No.: US 12,625,871 B1

Wilkes (45) Date of Patent: May 12, 2026

(54) EFFICIENT JOINS USING A SLIDING JOIN WINDOW

(71) Applicant: Hound Technology, Inc., San Francisco, CA (US)

(72) Inventor: Ian Wilkes, San Francisco, CA (US)

(73) Assignee: Hound Technology, Inc., San Francisco, CA (US)

( * ) Notice: Subject to any disclaimer, the term of this patent is extended or adjusted under 35 U.S.C. 154(b) by 0 days.

(21) Appl. No.: 18/978,360

(22) Filed: Dec. 12, 2024

(51) Int. Cl.
*G06F 16/00* (2019.01)
*G06F 16/2455* (2019.01)
*G06F 16/248* (2019.01)
*G06F 16/2453* (2019.01)

(52) U.S. Cl.
CPC ........ *G06F 16/2456* (2019.01); *G06F 16/248* (2019.01); *G06F 16/24544* (2019.01)

(58) Field of Classification Search
CPC ............... G06F 16/2456; G06F 16/248; G06F 16/24544
USPC ................................................. 707/600–899
See application file for complete search history.

(56) References Cited

U.S. PATENT DOCUMENTS

| | | | |
|---|---|---|---|
| 11,552,974 B1* | 1/2023 | Bagga ..................... | H04L 65/61 |
| 2018/0219889 A1* | 8/2018 | Oliner ...................... | G06N 5/01 |
| 2020/0210430 A1* | 7/2020 | Shen ...................... | G06F 16/221 |
| 2022/0067041 A1* | 3/2022 | Wright .................. | G06F 16/128 |
| 2024/0256542 A1* | 8/2024 | Ishizaka .............. | G06F 16/2453 |
| 2024/0320128 A1* | 9/2024 | Barron ................ | G06F 11/0754 |
| 2025/0130997 A1* | 4/2025 | Liu ................... | G06F 16/24545 |

* cited by examiner

*Primary Examiner* — Michelle N Owyang

(74) *Attorney, Agent, or Firm* — Patent Law Works LLP

(57) ABSTRACT

A system and method for performing relational style joins on large datasets is described. The system may include an observability platform configured to receive a request to perform a user query on a dataset. The query includes one or more filters to identify one or more spans in a trace. The dataset includes events and identifiers that may be retrieved based on the identified one or more spans in the trace, where the events have associated timestamps. A join window, dynamically sized based on the number of event identifiers, may be generated to process a list of generated data segments to perform one or more relational join operations on the dataset based on the one or more filters in the query, in memory. Relational join operations may be performed to generate a result set provided as a response to the request for display with data visualizations on the observability platform.

20 Claims, 14 Drawing Sheets

600

Receive a request to perform a query in association with a dataset on an observability platform, the request including user input defining the query, wherein the query includes one or more filters to identify one or more spans in a trace
602

Retrieve the dataset including a number of event identifiers
604

Generate a join window that is dynamically sized based on the number of event identifiers in the dataset
606

Generate a list of data segments based on the retrieved dataset
608

Process the list of data segments to perform one or more relational join operations on the dataset based on the query using the join window
610

Generate a result set based on the processed list of data segments
612

Provide the result set as a response to the request for display on the observability platform
614

Figure 3:
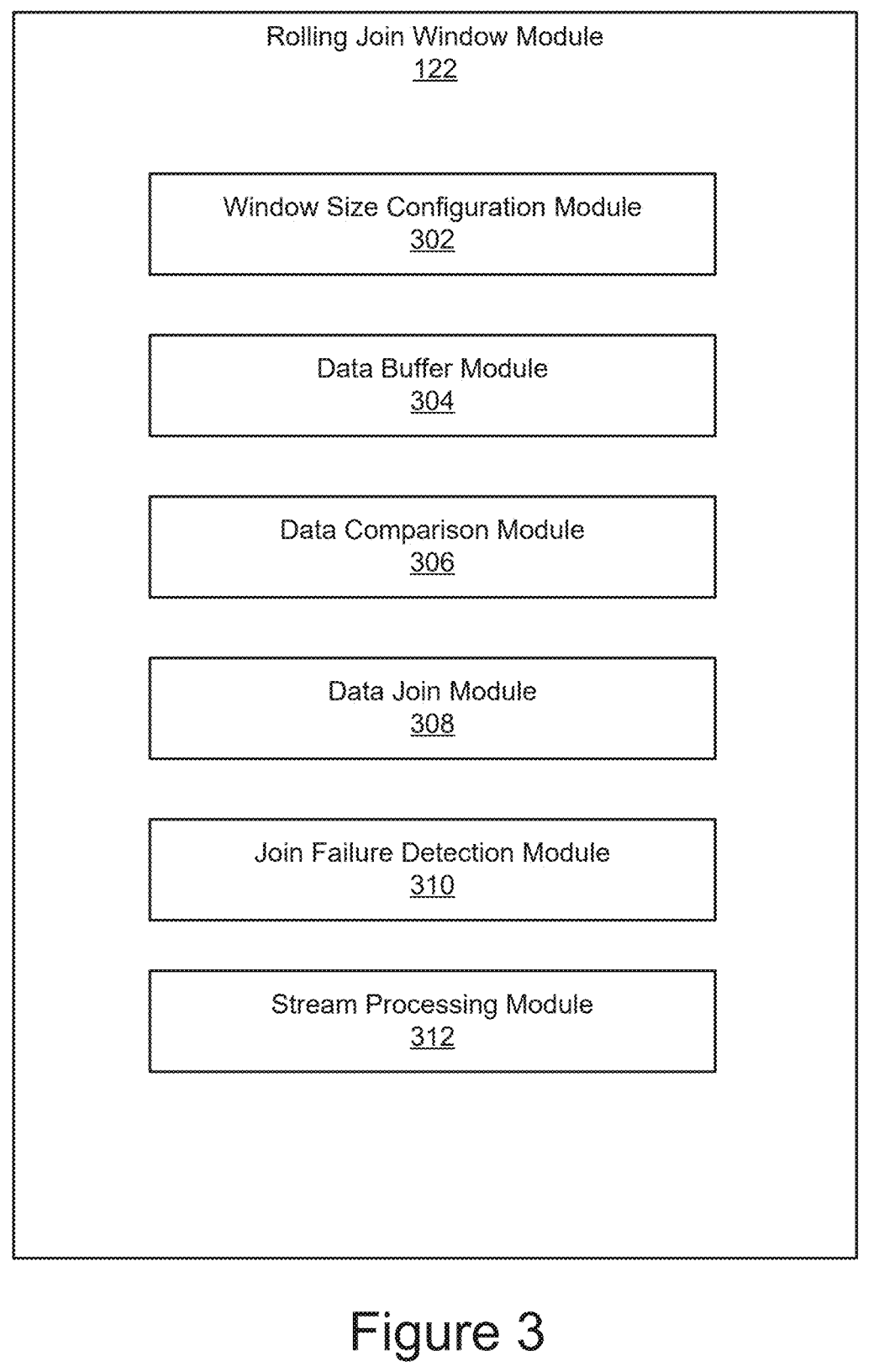

Rolling Join Window Module
122

Window Size Configuration Module
302

Data Buffer Module
304

Data Comparison Module
306

Data Join Module
308

Join Failure Detection Module
310

Stream Processing Module
312

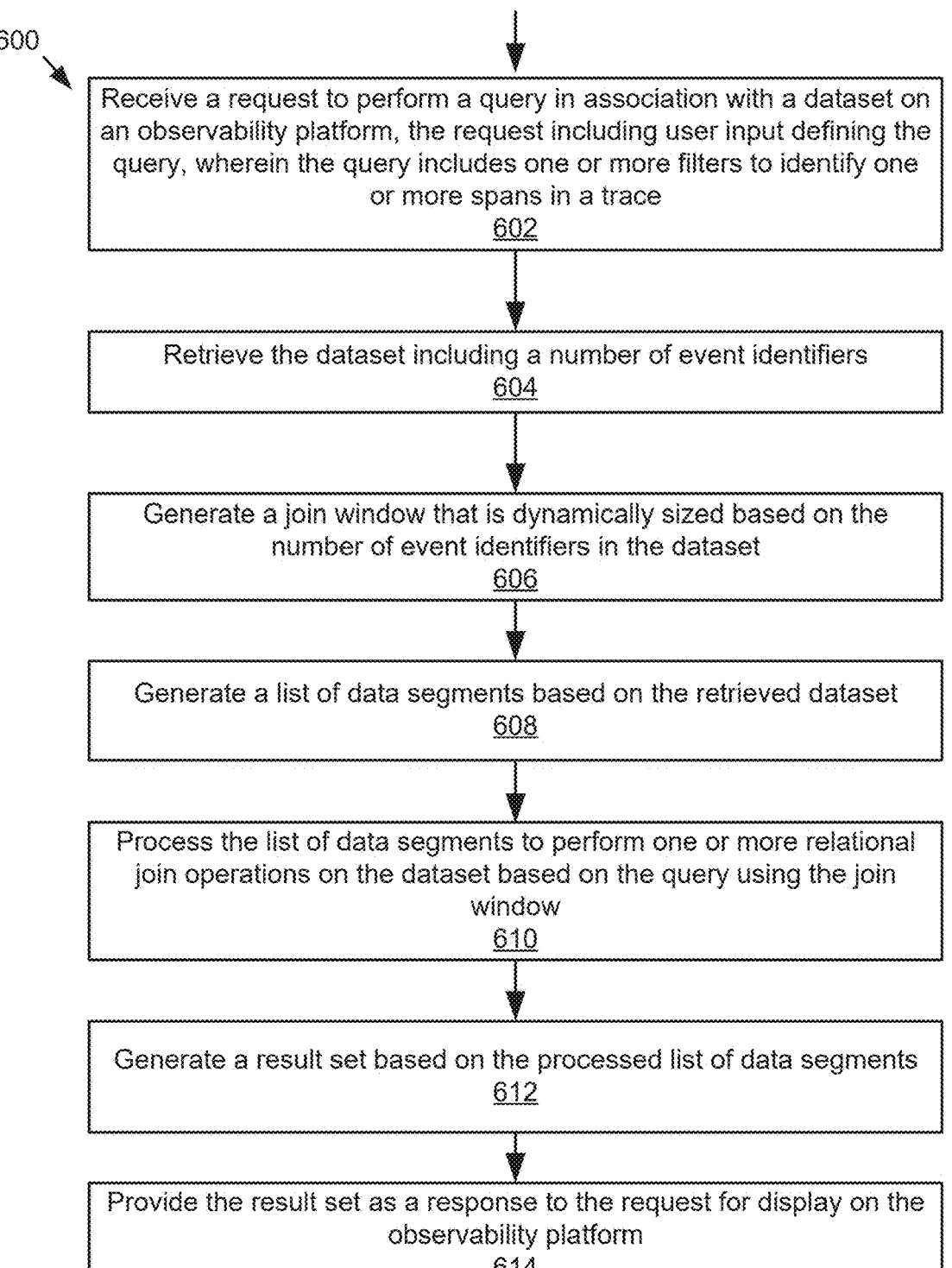

Receive a request to perform a query in association with a dataset on an observability platform, the request including user input defining the query, wherein the query includes one or more filters to identify one or more spans in a trace
602

Retrieve the dataset including a number of event identifiers
604

Generate a join window that is dynamically sized based on the number of event identifiers in the dataset
606

Generate a list of data segments based on the retrieved dataset
608

Process the list of data segments to perform one or more relational join operations on the dataset based on the query using the join window
610

Generate a result set based on the processed list of data segments
612

Provide the result set as a response to the request for display on the observability platform
614

Figure 6

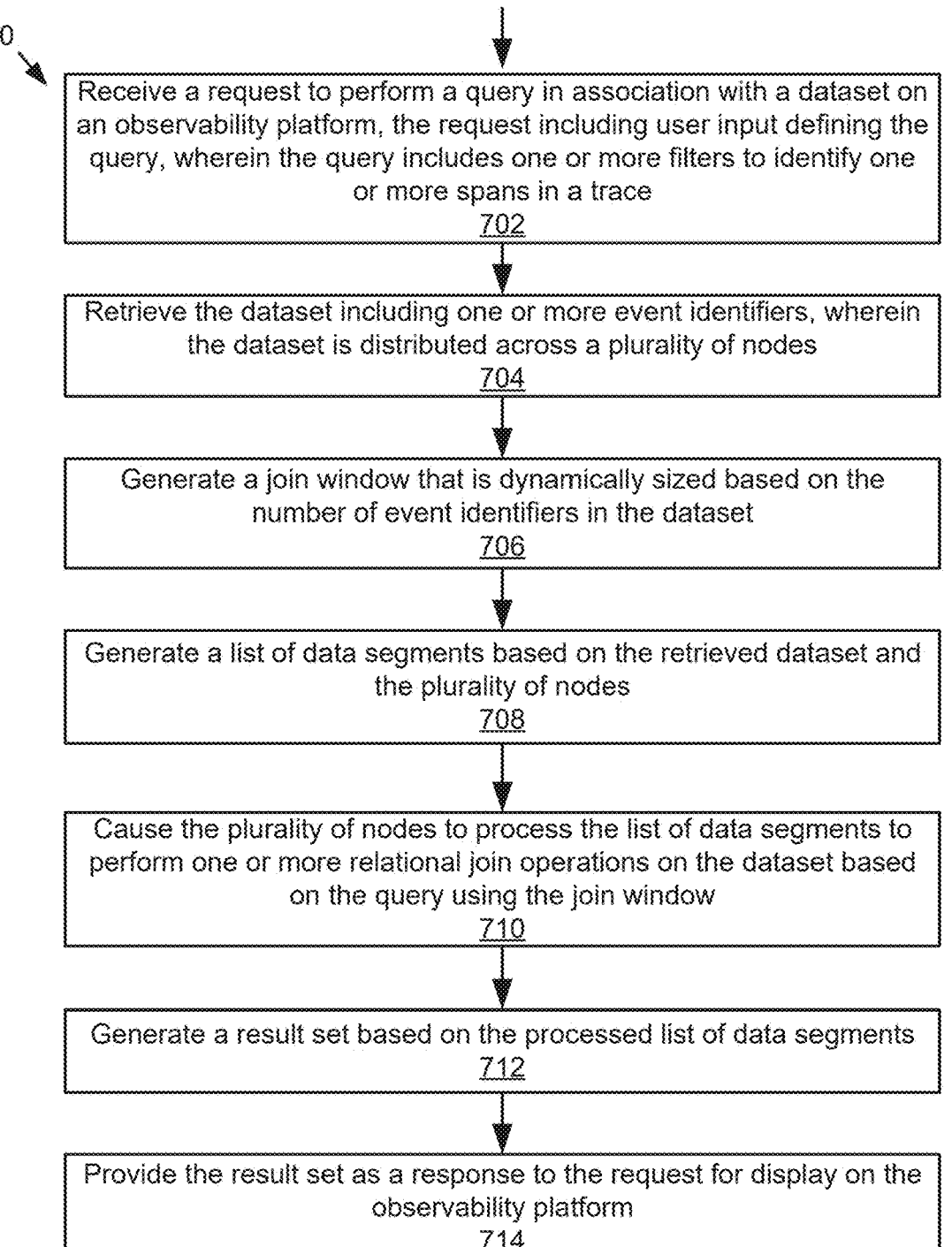

700

Receive a request to perform a query in association with a dataset on an observability platform, the request including user input defining the query, wherein the query includes one or more filters to identify one or more spans in a trace
702

Retrieve the dataset including one or more event identifiers, wherein the dataset is distributed across a plurality of nodes
704

Generate a join window that is dynamically sized based on the number of event identifiers in the dataset
706

Generate a list of data segments based on the retrieved dataset and the plurality of nodes
708

Cause the plurality of nodes to process the list of data segments to perform one or more relational join operations on the dataset based on the query using the join window
710

Generate a result set based on the processed list of data segments
712

Provide the result set as a response to the request for display on the observability platform
714

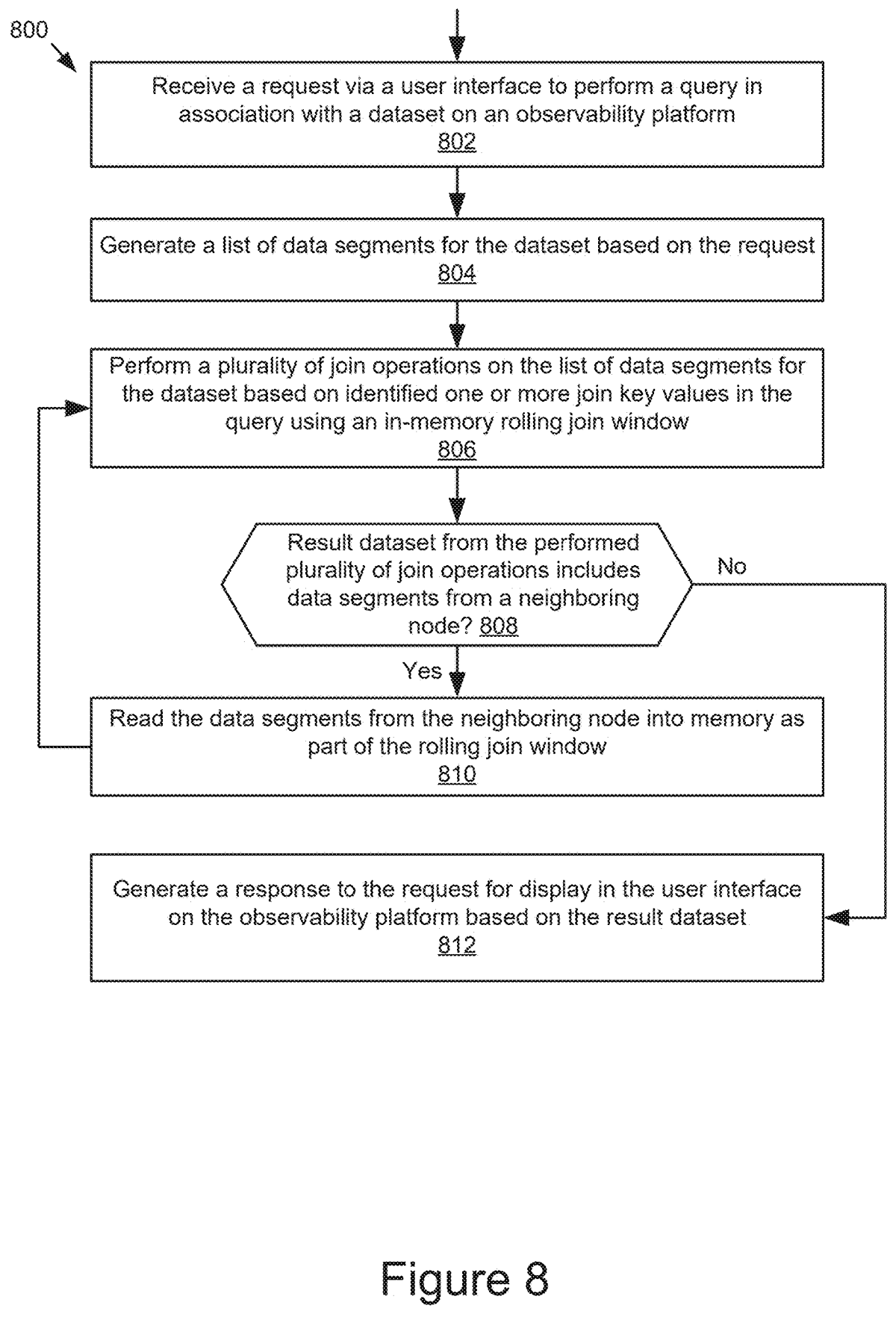

Receive a request via a user interface to perform a query in association with a dataset on an observability platform
802

Generate a list of data segments for the dataset based on the request
804

Perform a plurality of join operations on the list of data segments for the dataset based on identified one or more join key values in the query using an in-memory rolling join window
806

Result dataset from the performed plurality of join operations includes data segments from a neighboring node? 808

No

Yes

Read the data segments from the neighboring node into memory as part of the rolling join window
810

Generate a response to the request for display in the user interface on the observability platform based on the result dataset
812

Figure 8

EFFICIENT JOINS USING A SLIDING JOIN WINDOW

BACKGROUND

The present disclosure relates to systems and methods for analyzing large data sets to generate joins. In particular, the present disclosure relates to systems and methods for efficient joins using a sliding join window in an observability platform.

In recent years, tracking and optimizing performance of Internet-enabled software applications has generated larger and larger data sets. Various application performance monitoring (APM) solutions have emerged to enable organizations to improve user experiences by tracking key software application performance metrics using monitoring software and telemetry data. With the abundance of data available, and with increasing complexity and structures, it is often difficult to identify the root causes that may affect the user experience of a software application, such as latency. Specifically, as software applications are updated to fix bugs, release new features, and/or deploy applications on more complex structures, such as distributed systems or cloud computing platforms, the user experience may be negatively affected for reasons that are harder to determine. As such, there is a persistent need to improve the tools used to investigate and analyze the large amounts of data used to observe the performance of software applications. It would be beneficial to enable users of application performance monitoring solutions to better analyze data through relational queries to identify the root causes of performance issues.

SUMMARY

The present disclosure relates to an observability platform that enables performance monitoring data to be analyzed using relational style queries to join data items. An observability platform receives user-supplied data via the Internet and stores it on behalf of the user. This data takes the form of a series of time-ordered "spans" representing discrete events in the user's system, collected in logical groups known as "traces" which represent a single, larger operation. Collections of spans may be grouped into larger time-ordered "segments". An observability platform may be configured to receive a user request to perform a query in association with a dataset on an observability platform. The user request may include user input defining the query, where the query includes one or more filters to identify one or more spans in a trace. The filters may include criteria based on the relationship between two disparate spans in a trace, requiring a join in which the two spans are examined together. The observability platform's servers may use a "join window" to retain a limited number of spans in memory during query processing. A join window which is dynamically sized may be generated based on the number of event identifiers in the dataset. A list of data segments may be generated based on the retrieved dataset. A server may be configured to include a rolling join window module to process the list of data segments to perform (e.g., execute) one or more relational join operations on the dataset based on the one or more filters in the query using the join window. A result set may be generated based on the processed list of data segments and may be provided as a response to the request for display on the observability platform. Data visualizations may be provided on the observability platform based on the result data set of the processed query.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 is a block diagram illustrating a rolling join window module of the observability platform in accordance with some implementations.

FIG. 6 is an example flowchart diagram illustrating a method of generating a rolling join window in accordance with some implementations.

FIG. 7 is an example flowchart diagram illustrating a method of generating a rolling join window in accordance with some implementations.

FIG. 8 is an example flowchart diagram illustrating a method of performing a plurality of join operations using an in-memory rolling join window in accordance with some implementations.

DETAILED DESCRIPTION

Figure 1:
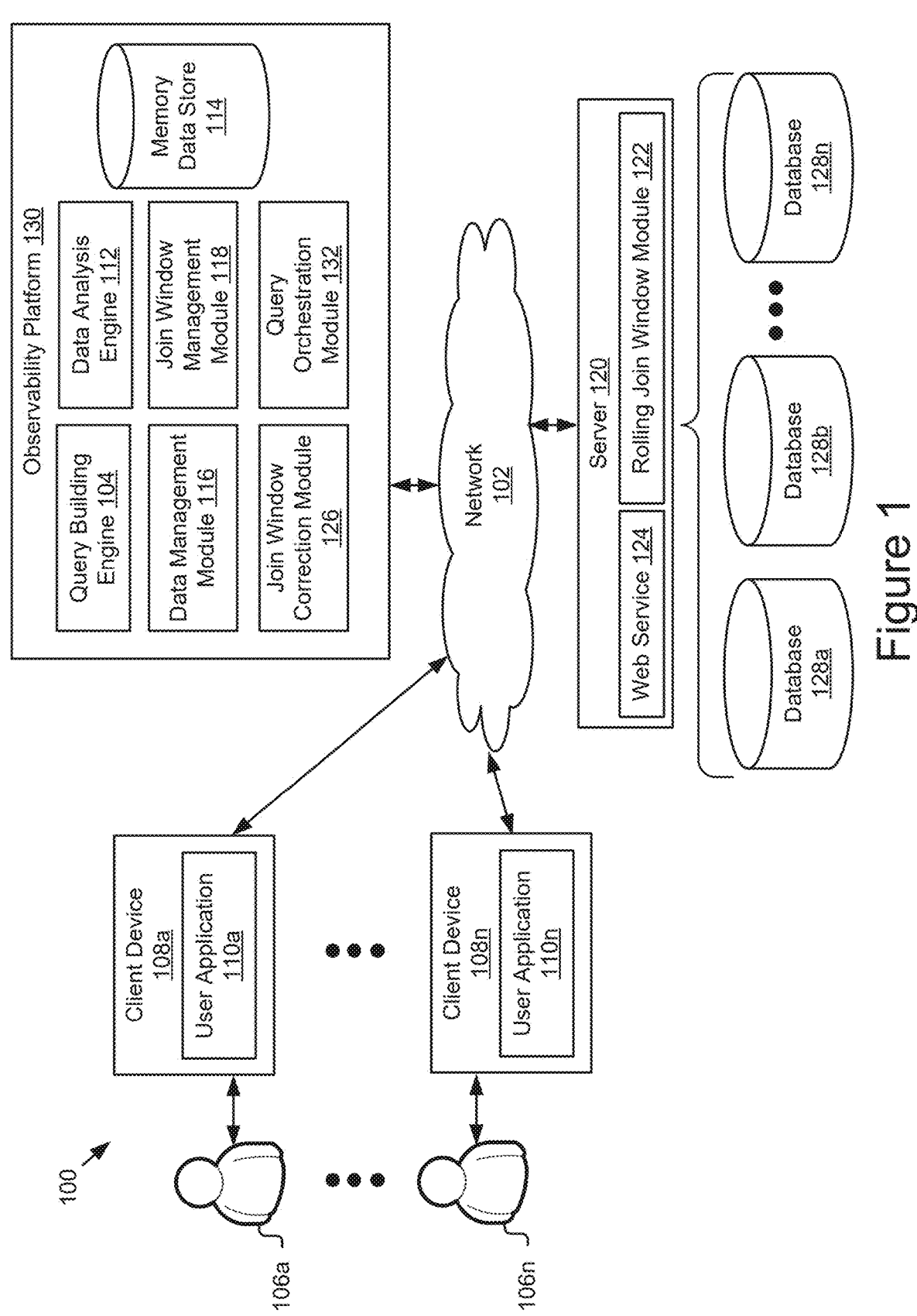
FIG. 1 is a high-level block diagram for relational joins illustrating a system including an observability platform in accordance with some implementations.

As set forth in detail below, the technology described herein provides an innovative approach to querying data in large data sets. In particular, the systems and methods described below advantageously enable a user to generate data queries that join data based on one or more attributes using a rolling join window in an observability platform. Part of this process includes enabling a user interface in a user application operable on a client device that receives user input that identifies query information that the user inputs to investigate data based on their relationship to each other within a trace. A trace is a unit of work that connects multiple events, or spans, across a distributed service. Traces are made up of spans, each with a unique identifier and datetime stamp. The metadata from each span is used to reconstruct relationships between them and generate a trace diagram. The user interface enables a user to select data using filters and attributes that, based on the user input, includes various information specific to the dataset that was imported into the observability platform, such as a description of names in a database schema that a user may query. For example, traces can help illustrate how data flows through a user's systems, identify errors, and find performance issues. Using traces enables a user to visualize how long a particular action or service request takes, or to determine which customer had a slow experience. Because spans are received and stored separately in time order, querying the span data was limited to querying attributes of specific spans and aggregating them based on matching criteria. Traditional join techniques employed by relational databases are not efficient for this type of data. However, because of the techniques described herein, users can generate queries based on relationships between spans, and filter result sets of certain spans based on attributes of other spans in the traces to which they belong.

For example, suppose a developer working for an e-commerce site wishes to find errors during the checkout process. The initial, "root" span has an attribute called "name" with the value "/cart/checkout", and represents the start of the journey represented by the trace as a whole. Subsequent spans included in the trace represent successive events in this journey, and may themselves include other attributes including errors. Previously, a query may be generated to identify traces where the root span has both an error and is named "/cart/checkout". However, it would not be able to find a similar trace where the root span is named "/cart/checkout" but the error occurs only on a subsequent span within the trace. Alternatively, it could find all spans with errors, but could not determine which were part of a trace where the corresponding root span is named "/cart/checkout". Now, with "relational fields," or user inputs that invoke the use of a rolling join window, the user may write a query that finds any error within the checkout journey, and further narrow the results to just the traces with the desired root span. By first adding a filter, root.name=/cart/checkout, the filter will find all spans linked to a corresponding root span named "/cart/checkout". Next, by adding a filter, error exists, the search will identify spans with errors. Lastly, by grouping by name, a count of the types of spans that have errored in the checkout flow will be shown in the query results. In this way, the user is presented with data that may be useful in identifying a root cause(s) for the errors. For example, the results of the query generated in this example may identify 11,128 message spans and 4,955 msdemo.CheckoutService/ PlaceOrder spans with errors where the root span was "/cart/checkout". The user now can investigate these two places to identify the root causes of the errors. Various processes and algorithms are used to execute these queries. In some implementations, a rolling join window may be incorporated to perform relational database-style joins on timeseries data. In an implementation, the results from a rolling join window function may be incorporated into a filter such that the query enables the user to further investigate the root causes of errors, for example.

While the present disclosure will now be described below with regard to databases and/or data stores of performance data metrics of production systems connected, through a network, to an observability platform and the user interfaces used to search traces for spans with errors on the observability platform, it should be understood that the databases and/or data stores described are just one example type of data that may be used with the present disclosure. The present disclosure is applicable to various other types of data including but not limited to performance optimization and customer support. These types of data may exist as part of relational databases, structured data, unstructured data, NoSQL databases, JSON databases, and so forth.

With reference to the figures, reference numbers may be used to refer to components found in any of the figures, regardless of whether those reference numbers are shown in the figure being described. Further, where a reference number includes a letter referring to one of multiple similar components (e.g., user $106a$, . . . and $106n$), the reference number may be used without the letter to refer to one or all of the similar components.

FIG. 1 is a high-level block diagram illustrating an example system 100 for relational joins in an observability platform.

The illustrated system 100 may include client devices $108a$ . . . $108n$ (also referred to herein individually and/or collectively as 108) that can be accessed by users $106a$ . . . $106n$, a server 120, and an observability platform 130, which are electronically communicatively coupled via a network 102 for interaction and electronic communication with one another, although other system configurations are possible including other devices, systems, and networks. For example, the system 100 could include any number of client devices 108, servers 120, observability platforms 130, networks 102, and other systems and devices. In some implementations, the observability platform 130 may be located remotely (e.g., separately from the network or physical location) from one or both of the client devices 108 and the server 120.

The network 102 may be a conventional type, wired or wireless, and may have numerous different configurations including a star configuration, token ring configuration, or other configurations. Furthermore, the network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, personal area networks (PANs) (e.g., Bluetooth® communication networks), peer-to-peer networks, near field networks (e.g., NFC, etc.), and/or other interconnected data paths across which multiple devices may communicate, various combinations thereof, etc. These private and/or public networks may have any number of configurations and/or topologies, and data may be transmitted via the networks using a variety of different communication protocols including, for example, various Internet layers, transport layers, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client devices 108*a* . . . 108*n* (also referred to individually and collectively as 108) may be computing devices having data processing and communication capabilities. In some implementations, a client device 108 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 108*a* . . . 108*n* may couple to and communicate with one another and the other entities of the system 100 via the network 102 using a wireless and/or wired connection, such as the local hub or the application server. Examples of client devices 108 may include, but are not limited to, mobile phones, tablets, laptops, desktops, netbooks, server appliances, servers, virtual machines, smart TVs, media streaming devices, or any other electronic device capable of accessing a network 102. The system 100 may include any number of client devices 108, including client devices 108 of the same or different type. A plurality of client devices 108*a* . . . 108*n* are depicted in FIG. 1 to indicate that the server 120 and observability platform 130 may interact with multiplicity of users 106*a* . . . 106*n* on a multiplicity of client devices 108*a* . . . 108*n*.

The client devices 108 may also store and/or operate other software such as a user application 110 (e.g., an instance of a user application 110*a* . . . 110*n*), an operating system, other applications, etc., that are configured to interact with the server 120 and/or the observability platform 130 via the network 102. In some implementations, the client device 108 may run a user application 110. For example, the user application 110 may be one or more of web, mobile, enterprise, and cloud application. The user application 110 may communicate with the server 120 and the observability platform 130. For example, the user application 110 may include a browser that may run JavaScript or other code to access the functionality provided by other entities of the system 100 coupled to the network 102. The user application 110 may connect to the server 120 via the web service 124, send one or more user selections of data, receive response data from the server 120, send the response data to the observability platform 130, and display the results on the client device 108. In some implementations, the client devices 108 may be implemented as a computing device 200 as will be described below with reference to FIG. 2.

In the example of FIG. 1, the entities of the system 100, such as the server 120 and the observability platform 130 may be, or may be implemented by, a computing device including a processor, a memory, applications, a database, and network communication capabilities similar to that described below with reference to FIG. 2. In some implementations, each one of the entities 120 and 130 of the system 100 may be a hardware server, a software server, or a combination of software and hardware.

The server 120 may include data processing, storing, and communication capabilities, as discussed elsewhere herein. For example, the server 120 may include one or more hardware servers, server arrays, storage devices, centralized and/or distributed/cloud-based systems, etc. In some implementations, the server 120 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, the server 120 may be a Hypertext Transfer Protocol (HTTP) server, a Representational State Transfer (REST) service, or other server type, having structure and/or functionality for processing and satisfying content requests and/or receiving content from the other entities coupled to the network 102. The server 120 may implement one or more stateful services and store session state for one or more client devices 108 interacting with it. For example, the server 120 may keep track of one or more requests from client devices 108, which client device has opened which file, current read and write pointers for files, which files are locked by which client device 108, etc.

In some implementations, the server 120 may be remote to the client device 108 and/or the observability platform 130, such that the server 120 communicates with the observability platform 130 to perform functions, thereby reducing complexity of the server 120. In the example of FIG. 1, the server 120 may include a web service 124 and a rolling join window module 122. The web service 124 may be dedicated to providing access to various services and information resources hosted by the server 120 via web, mobile, enterprise, and/or cloud applications. The web service 124 may include one or more of a software as a service, infrastructure as a service, platform as a service, function as a service, etc. For example, the web service 124 may include on-demand cloud computing service and associated application programming interface (API) for providing distributed computing processing capacity and software tools. In another example, the web service 124 may include allowing users to rent a virtual cluster of machines for deploying applications. It should be noted that the list of services provided as examples for the web service 124 above are not exhaustive and that others are contemplated in the techniques described herein.

In an implementation, the rolling join window module 122 may include software and/or logic to provide the functionality for generating and executing a rolling join window across one or more databases 128*a*-128*n*, which store span data in a series of time-ordered segments. In another implementation, the rolling join module 122 may comprise part of a stream-processing engine, in which data is not stored but is processed immediately upon receipt from an external system or third party. In another implementation, the rolling join window module 122 may comprise a third-party analytical data engine, accessible through an API. In such an implementation, the server 120 comprises a third-party server, wherein the web service 124 comprises the API through which the third-party analytical data engine is accessed. In another implementation, the rolling join window module 122 may comprise an analytical data engine incorporated into the system of the observability platform. As such, the rolling join window module 122 may be closely integrated into the existing operations of the observability platform. In other implementations, the rolling join window module 122 may comprise a specialized analytical data engine tuned for a specific type of use case, such as performance monitoring of software applications used in production. In other implementations, the rolling join window module 122 operates primarily on client devices 108, embedded within the user application 110.

The observability platform 130 may include data processing, storing, and communication capabilities, as discussed in a related application, U.S. application Ser. No. 17/837,924, titled "Impatient System for Querying Stateless Computing Platforms," and filed on Jun. 10, 2022, hereby incorporated by reference. The observability platform 130 may be implemented as a serverless computing architecture that allocates machine resources on demand to perform one or more computational tasks. The observability platform 130 may rely on the server 120 to maintain session state. In the example of FIG. 1, the observability platform 130 may include a query building engine 104 that uses an impatient query engine and serverless function(s) (not pictured). A serverless function may be a self-contained serverless application code written in a supported language and runtime to perform one or more computational tasks. For example, a function may be an independent unit of execution and deployment, such as a microservice. The observability platform 130 is configured to execute many instances of the same function or of different functions in an efficient and flexible manner. The observability platform 130 executes each function in its own container. For example, when a function is created, the observability platform 130 packages it into a new container and executes that container on a multi-tenant cluster of machines on demand. In some implementations, the observability platform 130 executes one or more functions in response to events (e.g., multiple individual requests with associated timestamps) and automatically manages the computing resources required by that code. For example, the observability platform 130 may be configured to receive HTTP requests from the server 120 via an API of the web service 124, automatically provision back-end services triggered by the HTTP requests and deallocate such services when corresponding application code is not in use. The observability platform 130 sends the response generated by the functions for individual requests to the server 120 which then collates the responses into a final result. In some implementations, the observability platform 130 may also access one or more databases 128 through network 102 and server 120 to store structured data in a relational database and a file system (e.g., HDFS, NFS, etc.) for unstructured or semi-structured data. In some implementations, the observability platform 130 may include a memory data store 114 that stores various types of data for access and/or retrieval by the impatient query engine. For example, the memory data store 114 may store a table for the rolling join window that is generated in response to a query request. Other types of user data are also possible and contemplated. It should be understood that a single observability platform 130 may be representative of a cloud computing service provider and there may be multiple cloud computing service providers coupled to the network 102, each having its own server or a server cluster, applications, application programming interface, etc.

In an implementation, the query building engine 104 may include software and/or logic to provide the functionality for enabling a user of the observability platform to use natural language processing (NLP) to generate an executable query as described above. In some implementations, the query building engine 104 may be implemented using programmable or specialized hardware, such as a field-programmable gate array (FPGA) or an application-specific integrated circuit (ASIC). In some implementations, the query building engine 104 may be implemented using a combination of hardware and software. In some implementations, the query building engine 104 may be stored and executed on various combinations of the client device 108, the server 120, and the observability platform 130, or by any one of the client devices 108, the server 120, or the observability platform 130. As depicted in FIG. 1, the query building engine 104 is shown to indicate that the operations performed by the query building engine 104 as described herein may be performed at the observability platform 130. In other implementations, the query building engine 104 may be a thin-client application with some functionality executed on the server 120 and additional functionality executed on the observability platform 130. While the query building engine 104 is described below as a standalone component, in some implementations, the query building engine 104 may be part of other applications in operation on the client device 108, the server 120, and the observability platform 130.

As further illustrated in FIG. 1, the observability platform 130 may include software and/or logic to provide the functionality for generating a rolling join window to enable a process to produce relational database style joins as a response to received user input for the observability platform 130 to produce query results based on the identified filters in the generated query included in the user input, according to an implementation. For example, the observability platform 130 may include a data analysis engine 112, a data management module 116, a join window management module 118, a join window correction module 126, and a query orchestration module 132.

The data analysis engine 112 may include software and/or logic to provide the functionality for enabling the observability platform 130 to perform a relational database style join on time series data in response to a request to query trace data. The data analysis is performed on datasets retrieved through network 102 from databases 128a-128n. For example, based on the user input in a query request, one or more filters may be applied to multiple data stores to generate a dataset. A first data store, such as database 128a, may include data that fits the criteria of the query based on the one or more filters. A second data store, such as database 128b, may further include data that satisfies the criteria of the query based on the one or more filters. Other data stores, such as other databases 128, may also include data that satisfies the criteria of the query. Through the rolling join window module 122 of server 120, the multiple datasets retrieved from the databases 128 may be joined in a relational database style join using an in-memory rolling join window. The data analysis engine 112 then utilizes an algorithm that takes advantage of temporal locality between left and right sides of the join. For example, suppose a single table has multiple rows of data with a datetime attribute as well as other attributes which can be filtered on through a user-inputted query. Traditional implementations of a relational join would require either a pre-built index on at least one of the fields or two differently-sorted copies of the table. Both of these implementations are very expensive to maintain, in terms of computing resources, when working with real-time data which constantly receives updates. However, traces have finite duration and so spans within a trace are close together in time. Here, in an implementation, the data analysis engine 112 avoids the expense of a traditional join by taking advantage of this nearness in time: when the tables stored by databases 128 are sorted by time, spans from any given trace are similarly near each other in the table. To perform the join, each table is read only once, keeping a fixed number of rows in memory (the "join window"), in a first-in-first-out buffer. Each time a row is read, it is compared only to rows in the join window, and the join is completed whenever a match is found by the data analysis engine 112. The result of this approach is that an arbitrary join on any fields in the table can be performed in a single pass, using constant memory, regardless of the size of the table. The size of the memory required is dependent on the maximum distance between potential left and right sides of a join, which is determined by the maximum duration of any given trace, a property which can be typically known or estimated in advance. In this case, joins are allowed within specific groups of rows which have bounded temporal distance, enabling a finite join window to produce reliable results. This beneficially creates functionality for users that was previously impossible or very expensive to execute.

An example use case illustrates how the data analysis engine 112 may be used in when troubleshooting technical issues, especially in distributed systems, to help the viewing user understand and identify a root cause of an error or during an investigation where crucial information is dispersed across various spans or layers of the system. For example, if an error is happening further down the stack, the error may show up on a span deep within a trace, but attributes related to team information were only included with the root span of that trace. In order to identify which teams are affected by that specific error, the viewing user needs the ability to query on deeply-nested error spans and their traces' root spans. Using data analysis engine 112, various data analysis may be performed to enable users 106 to determine whether various thresholds have been crossed to trigger alerts, notifications, and the like. Yet, spans that had notification-related errors populated may not have access to the team information. Users 106 may rely on the observability platform 130 to gain insights into various performance metrics regarding a software application on a third-party server and/or service accessible through network 102. The software application may include any number of software services and be structured according to any number of software designs. For the purposes of illustration only, an example software application may be in an e-commerce use case, such as where the software application is used to sell products and/or services on a website and/or mobile application. The software application may include a checkout software service that applies a discount code, such as the word "YOINK" as well as other discount codes, like "FF20OFF" and "JUICY," among other words. A querying user may want to locate spans where a particular service (e.g., a database call) takes longer than a threshold (e.g., 200 ms) and its parent span is in the application layer. An example query may be drafted, such as "VISUALIZE COUNT, P95 (duration_ms) WHERE type=db.query AND duration_ms>200 AND parent.service=app" in a query user input interface on the observability platform 130. Once queries are executed, the join window will be utilized to join data items from the parent span, which may include data that is dispersed across various nodes. Additionally, other queries, including one or more various queries that are associated with one or more service level objectives ("SLOs"), may be performed to utilize a join window where the joined data items each meet a threshold for the one or more SLOs, indicating which SLOs were violated, where the "GROUP BY" operator in the query may join on the root span. Predetermined queries such as these queries associated with SLOs may be generated by users 106 and/or administrators of the observability platform 130 to increase the speed of data retrieval by optimizing the queries through various preprocessing methods and/or techniques, in an implementation.

The data analysis engine 112 may include various techniques, methods, and algorithms to generate a usage analysis to understand the volume, performance, or usage per service at times, in an implementation. For example, a user may query the event count by root span name in order to find out how many events each of their serverless functions or API endpoints are generating. The query may be drafted like, "VISUALIZE COUNT GROUP BY root.name" in an implementation. The "root." prefix enables the user to narrow the query to only spans that have root spans with specific attributes. Other prefixes may be used, including "parent." which enables the user to narrow a query to spans whose direct parent span has specific attributes. With both root and parent prefixes, the user relies on previous knowledge of the shape of traces, such as a parent hierarchy or what is on the root. Another prefix, the "any." prefix, enables a user to narrow the query to spans where a single other span with the trace has specific attributes.

As another example, a user that may want to find any spans with errors during the checkout process where a discount code was used may execute an example query utilizing both the root. and any. prefixes, such as "VISUALIZE COUNT WHERE root.name=/cart/checkout AND any.name=getDiscounts AND error exists GROUP BY error" in an implementation. The query function, as described above, may be executed to find the count of all spans where an error exists, where any span in the same trace is named getDiscounts, and where its root span is named "/cart/checkout." In this way, the data analysis engine 112 enables a user 106 to investigate the number of errors in the software application using the data analysis function enabled by relational joins where the root cause may be found in information dispersed across various spans or layers of the system, especially in distributed systems.

The query building engine 104 may include a user interface that enables the user to simply input natural language text to simplify the process further. For example, a user may input "slow requests" in a "Query Assistant" text field and then click on a "Get Query" button. A parser may identify the terms "slow" and "requests" in the user input and insert a pre-programmed query, in an implementation. The query building engine 104 may include data processing, storing, and communication capabilities, as discussed in a related application, U.S. Application No. 63/499,691, titled "Query Building using Generative AI," and filed on May 2, 2023, hereby incorporated by reference. In an implementation, the query building engine 104 may enable a user to simply input natural language text such as "Show any errors with discount codes in my checkout car process" to perform a data analysis on any identified errors with discount codes in "/cart/checkout" as described above with respect to the data analysis engine 112.

A data management module 116 may include software and/or logic to provide the functionality for managing the data being requested and retrieved by the rolling join window module 122 when executed as a data analysis function in a query in the observability platform 130. As described in the examples above, the data analysis function may be executed in a query in a graphical user interface, such as a query building user interface, as well as other user interfaces where a query may be inputted and executed. The data management module 116 responds to the data requests from the query building engine 104 and the data analysis engine 112 within the observability platform 130. In an embodiment, the data management module 116 connects over the network 102 to the server 120 which includes web server 124 and the rolling join window module 122 that manages the data stored in the databases 128a-n. For example, in a distributed system, the rolling join window module 122 may operate in concert with the data management module 116 to ensure that the data being retrieved from the databases 128a-n meet the query as inputted by a user of the observability platform 130 and executed by the query building engine 104.

A join window management module 118 may include software and/or logic to provide the functionality for managing a join window that is created based on the data analysis function of the data analysis engine 112 in the observability platform 130. For example, a join window may be created, in memory, that includes only the rows in the join window. An arbitrary join on any fields in the table can be performed in a single pass, using constant memory, regardless of the size of the table. The size of memory required is dependent on the maximum distance between potential left and right sides of a join, an external property of the system, in an implementation. Because the observability platform 130 works with real-time data that is constantly receiving updates, the join window management module 118 manages what data is being included in the join window. In one embodiment, the join window management module 118 includes a time range such that only the time-bound rows are included in the join window. In this way, the join window takes advantage of temporal locality between the left and right sides of the join. The joined pairs are "near" each other in time, so when the table is sorted by time, they are similarly near each other in the table. In an embodiment, a fixed number of rows is kept in memory (e.g., the "join window") in a first-in-first-out buffer. Each time a row is read, it is compared only to rows in the join window, and the join is completed whenever a match is found. The match is performed by the data analysis engine 112, in an embodiment, and the join window management module 118 determines how many rows may be kept in the join window in memory, in an implementation.

In an implementation, the join window management module 118 may include software and/or logic to provide the functionality for generating a temporal window based on a defined time period. For example, the join window may be reserved for rows of data within the last 5 minutes. In another example, the join window may be a temporal window of under 1 minute. For time periods under 1 minute, there may be no lower bound to the number of rows, in an implementation. As a further example, a 15-minute time period may be used for less continuous data. The join window may include a number of rows of time-series data, or event data. Thus, the number of events may vary depending on the use cases, from user interface event streams, such as clicks and interactions with user interface elements, to large scale batch jobs with thousands and even millions of events. In an implementation, the join window may be sized on a per query basis to accommodate the different data sizes.

A join window correction module 126 may include software and/or logic to provide the functionality for correcting a join window size based on one or more factors in the observability platform 130, in an implementation. For example, the join window size is dependent on the amount of memory available to fit the data being requested. In an embodiment, the join window correction module 126 may provide a dynamic join window size such that the size varies based on a particular parameter. In other embodiments, the join window size may be corrected to a size requested by a user or an administrator of the observability platform 130. In an implementation, where there are problems with data ingestion for large-scale batch jobs, the join window size may be corrected to accommodate the large-scale batch jobs.

A query orchestration module 132 may include software and/or logic to provide the functionality for orchestrating a query using data divided into segments based on the data analysis request from the data analysis engine 112 in the observability platform 130. For example, the query orchestration module 132 may identify a dataset and based on the metadata, have an awareness of what data exists. Thus, the query orchestration module 132 may define a time range, a number of events per data segment, and identify which databases 128*a*-*n* which data segments, in an implementation. The data segments that are known to the query orchestration module 132 may be timed and/or coordinated such that the query is executed in stages to accommodate the join window size to perform the relational joins in memory. The query orchestration module 132 may modify the query to incorporate this coordination and/or timing based on the query request from the query building engine 104, in an implementation.

A rolling join window module 122 may include software and/or logic to provide the functionality for interacting with and managing the requests of the query building engine 104. For example, the rolling join window module 122 may be included on the server 120 and may receive a request over the network 102 from the query building engine 104 on the observability platform 130. The query may include data from multiple databases 128, and the rolling join window module 122 may be tasked with reading rows of data from the multiple databases 128 into the memory data store 114 in a single table. Thus, the "join window" in a dynamic, constantly changing data table that may be time bound, in an implementation, or be sized based on the number of events in the dataset, as managed by the join window management module 118. The data management module 116 may interact with the rolling join window module 122 as well as the query orchestration module 132, such that the data from databases 128 are read into memory data store 114 as a first-in-first-out buffer. The data segments may be orchestrated, in an implementation, such that a large task may be distributed into smaller tasks. In this approach, each node may be given a section of the table for which it may source both left and right rows, and is further given one join window's worth of data both above and below its section, from which it may source only right rows. Thus, this allows the join to be broken down into smaller parts, with a fraction of the table read by multiple nodes, ensuring that no redundant results are produced. In another implementation, the rolling join window module 122 may implement a stream processor that examines rows as they are generated by an external source and then discards them. Traditional joins may not be possible in this scenario, but assuming streamed rows are generated in temporal order, a streaming application can maintain a join window in-memory and perform joins on the streamed data.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 120 to a client device 108, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
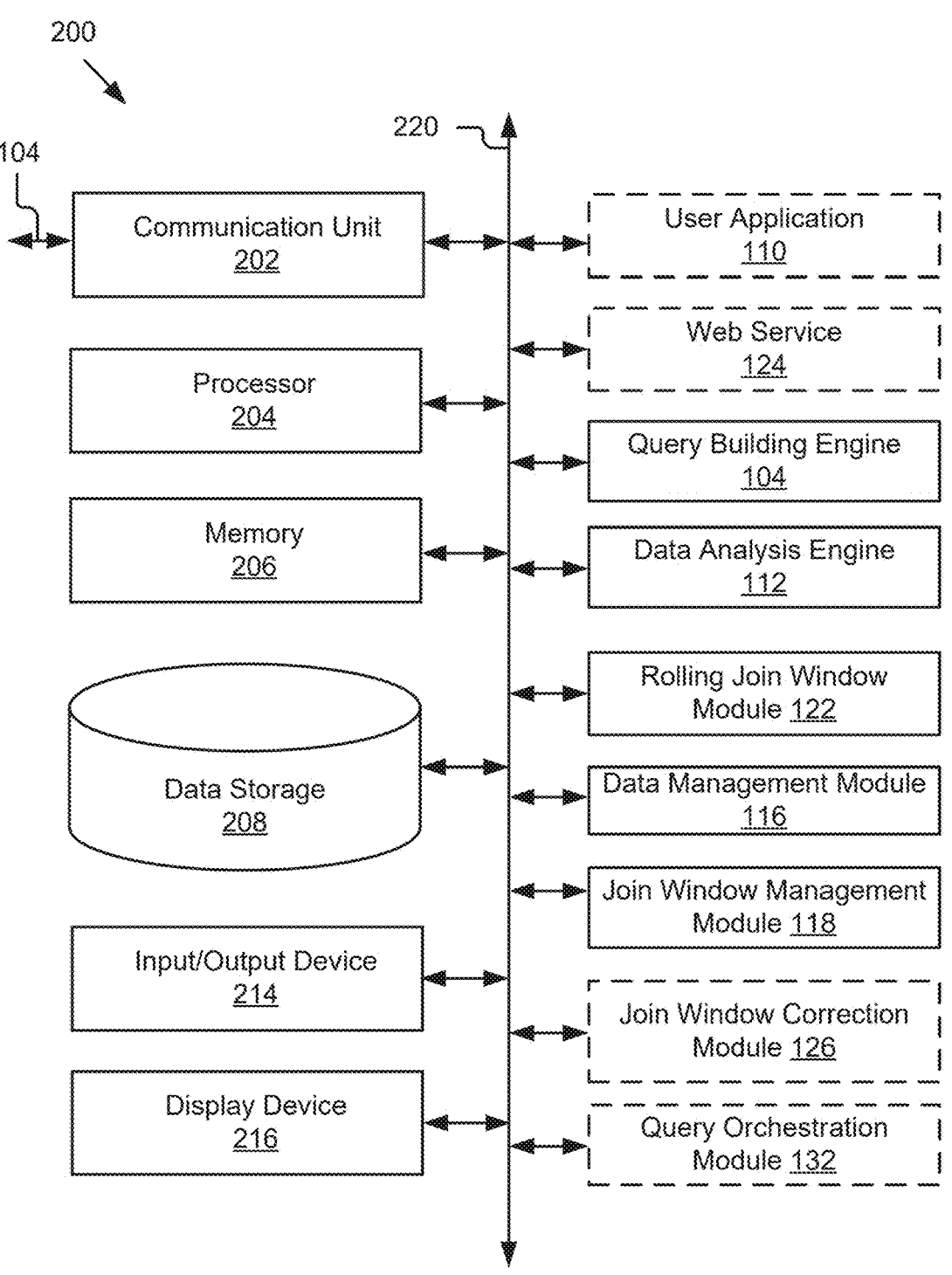
FIG. 2 is a block diagram illustrating a computing device including software modules used in the system of FIG. 1, including the observability platform in accordance with some implementations.

FIG. 2 is a block diagram of an example computing device 200 in the system 100.

The computing device 200 may include a processor 204, a memory 206, a display device 216, a communication unit 202, an input/output device(s) 214, and a data storage 208, according to some examples. The components of the computing device 200 are communicatively coupled by a bus 220. In some implementations, the computing device 200 may be representative of the client device 108, the server 120, the observability platform 130, or a combination of the client device 108, the server 120, and the observability platform 130. In such implementations where the computing device 200 is the client device 108, the server 120 or the observability platform 130, it should be understood that the client device 108, the server 120, and the observability platform 130 may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. For example, while not shown, the computing device 200 may include sensors, capture devices, various operating systems, additional processors, and other physical configurations.

As depicted in FIG. 2, the computing device 200 may include a user application 110, a web service 124, a query building engine 104, a rolling join window module 122, a data analysis engine 112, a data management module 116, a join window management module 118, a join window correction module 126, or a query orchestration module 132 depending on the configuration. For instance, a client device 108 may include the user application 110; a server 120 may include the rolling join window module 122 and web service 124; and the observability platform 130 may include one or more of the query building engine 104, the data analysis engine 112, the data management module 116, the join window management module 118, the join window correction module 126, and the query orchestration module 132; although other configurations are also possible and contemplated.

The user application 110 includes computer logic executable by the processor 204 on a client device 108 to provide for user interaction, receive user input, present information to the user via a display, and send data to and receive data from the other entities of the system 100 via the network 102. In some implementations, the user application 110 may generate and present user interfaces based at least in part on information received from the server 120 via the network(s) 102. The user application 110 may perform other operations described herein.

The query building engine 104 may include computer logic executable by the processor 204 to perform operations discussed elsewhere herein. The query building engine 104 may be coupled to the data storage 208 to store, retrieve, and/or manipulate data stored therein and may be coupled to the web service 124, the user application 110, and/or other components of the system 100 to exchange information therewith.

The rolling join window module 122 may include computer logic executable by the processor 204 to perform operations discussed elsewhere herein. The rolling join window module 122 may be coupled to the data storage 208 to store, retrieve, and/or manipulate data stored therein and may be coupled to the query building engine 104, the web service 124, and/or other components of the system 100 to exchange information therewith.

The data analysis engine 112 may include computer logic executable by the processor 204 to perform operations discussed elsewhere herein. The data analysis engine 112 may be coupled to the data storage 208 to store, retrieve, and/or manipulate data stored therein and may be coupled to the query building engine 104, the web service 124, and/or other components of the system 100 to exchange information therewith.

The data management module 116 may include computer logic executable by the processor 204 to perform operations discussed elsewhere herein. The data management module 116 may be coupled to the data storage 208 to store, retrieve, and/or manipulate data stored therein and may be coupled to the query building engine 104, the web service 124, and/or other components of the system 100 to exchange information therewith.

The join window management module 126 may include computer logic executable by the processor 204 to perform operations discussed elsewhere herein. The join window management module 126 may be coupled to the data storage 208 to store, retrieve, and/or manipulate data stored therein and may be coupled to the query building engine 104, the web service 124, and/or other components of the system 100 to exchange information therewith.

The join window correction module 126 may include computer logic executable by the processor 204 to perform operations discussed elsewhere herein. The join window correction module 126 may be coupled to the data storage 208 to store, retrieve, and/or manipulate data stored therein and may be coupled to the query building engine 104, the web service 124, and/or other components of the system 100 to exchange information therewith.

The query orchestration module 132 may include computer logic executable by the processor 204 to perform operations discussed elsewhere herein. The query orchestration module 132 may be coupled to the data storage 208 to store, retrieve, and/or manipulate data stored therein and may be coupled to the query building engine 104, the web service 124, and/or other components of the system 100 to exchange information therewith.

The web service 124 may include computer logic executable by the processor 204 to process content requests and provide access to various services and information resources. The web service 124 may include one or more of a software as a service, infrastructure as a service, platform as a service, function as a service, or other suitable service type. The web service 124 may receive content requests (e.g., product search requests, HTTP requests) from the client device 108, cooperate with the query building engine 104 to determine content, retrieve and incorporate data from the data storage 508, format the content, and provide the content to the client device 108.

In some instances, the web service 124 may format content using a web language and provide the content to a corresponding user application 110 for processing and/or rendering to the user for display. The web service 124 may be coupled to the data storage 208 to store, retrieve, and/or manipulate data stored therein and may be coupled to the query building engine 104 to facilitate its operations, for example.

The processor 204 may execute software instructions by performing various input/output, logical, and/or mathematical operations. The processor 204 may have various computing architectures to process data signals including, for example, a complex instruction set computer (CISC) architecture, a reduced instruction set computer (RISC) architecture, and/or an architecture implementing a combination of instruction sets. The processor 204 may be physical and/or virtual, and may include a single processing unit or a plurality of processing units and/or cores. In some implementations, the processor 204 may be capable of generating and providing electronic display signals to a display device 216, supporting the display of images, capturing and transmitting images, and performing complex tasks including various types of feature extraction and sampling. In some implementations, the processor 204 may be coupled to the memory 206 via the bus 220 to access data and instructions therefrom and store data therein. The bus 220 may couple the processor 204 to the other components of the computing device 200 including, for example, the memory 206, the communication unit 202, the display device 216, the input/output device(s) 214, and the data storage 208.

The memory 206 may store and provide access to data for the other components of the computing device 200. The memory 206 may be included in a single computing device or distributed among a plurality of computing devices as discussed elsewhere herein. In some implementations, the memory 206 may store instructions and/or data that may be executed by the processor 204. For example, the memory 206 may store one or more of the user application 110, query building engine 104, web service 124, data analysis engine 112, rolling join window module 112, data management module 116, join window management module 118, join window correction module 126, query orchestration module 132, and their respective components, depending on the configuration. The instructions and/or data may include code for performing the techniques described herein. The memory 206 is also capable of storing other instructions and data, including, for example, an operating system, hardware drivers, other software applications, databases, etc. The memory 206 may be coupled to the bus 220 for communication with the processor 204 and the other components of the computing device 200.

The memory 206 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 204. In some implementations, the memory 206 may include one or more of volatile memory and non-volatile memory. It should be understood that the memory 206 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 may include a communication bus for transferring data between components of the computing device 200 or between computing device 200 and other components of the system 100 via the network 102 or portions thereof, a processor mesh, a combination thereof, etc. In some implementations, the components (e.g., 110, 124, 104, 112, 122, 116, 118, 126, 132) and various other software operating on the computing device 200 (e.g., an operating system, device drivers, etc.) may cooperate and communicate via a software communication mechanism implemented in association with the bus 220. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.)

The communication unit 202 is hardware for receiving and transmitting data by linking the processor 204 to the network 102 and other processing systems via signal line 104. The communication unit 202 may receive data such as requests from the client device 108 and transmit the requests to the web service 124 and query building engine 104, for example. The communication unit 202 also transmits information including media to the client device 108 for display, for example, in response to the request. The communication unit 202 is coupled to the bus 220. In some implementations, the communication unit 202 may include a port for direct physical connection to the client device 108 or to another communication channel. For example, the communication unit 202 may include an RJ45 port or similar port for wired communication with the client device 108. In other implementations, the communication unit 202 may include a wireless transceiver (not shown) for exchanging data with the client device 108 or any other communication channel using one or more wireless communication methods, such as IEEE 802.11, IEEE 802.16, Bluetooth® or another suitable wireless communication method. In yet other implementations, the communication unit 202 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still other implementations, the communication unit 202 may include a wired port and a wireless transceiver. The communication unit 202 also provides other conventional connections to the network 102 for distribution of files and/or media objects using standard network protocols such as TCP/IP, HTTP, HTTPS, and SMTP as will be understood to those skilled in the art.

The display device 216 may be any conventional display device, monitor or screen, including but not limited to, a liquid crystal display (LCD), light emitting diode (LED), organic light-emitting diode (OLED) display or any other similarly equipped display device, screen or monitor. The display device 216 represents any device equipped to display user interfaces, electronic images, and data as described herein. In some implementations, the display device 216 may output display in binary (only two different values for pixels), monochrome (multiple shades of one color), or multiple colors and shades. The display device 216 is coupled to the bus 220 for communication with the processor 204 and the other components of the computing device 200. In some implementations, the display device 216 may be a touchscreen display device capable of receiving input from one or more fingers of a user. For example, the display device 216 may be a capacitive touchscreen display device capable of detecting and interpreting multiple points of contact with the display surface. In some implementations, the computing device 200 (e.g., client device 108) may include a graphics adapter (not shown) for rendering and outputting the images and data for presentation on display device 216. The graphics adapter (not shown) may be a separate processing device including a separate processor and memory (not shown) or may be integrated with the processor 204 and memory 206.

The input/output (I/O) device(s) 214 may include any standard device for inputting or outputting information and may be coupled to the computing device 200 either directly or through intervening I/O controllers. In some implementations, the I/O device 214 may include one or more peripheral devices. Non-limiting example I/O devices 214 include a touch screen or any other similarly equipped display device equipped to display user interfaces, electronic images, and data as described herein, a touchpad, a keyboard, a pointing device, a printer, a haptic device, a scanner, an image/video capture device (e.g., camera), a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the I/O device 214 and the display device 216 may be integrated, and a user of the computing device 200 (e.g., client device 108) may interact with the computing device 200 by contacting a surface of the display device 316 using one or more fingers. For example, the user may interact with an emulated (i.e., virtual or soft) keyboard displayed on the touchscreen display device 216 by using fingers to contact the display in the keyboard regions.

The data storage 208 is a non-transitory memory that stores data for providing the functionality described herein. In some implementations, the data storage 208 may be coupled to the components of the computing device 200 via the bus 220 to receive and provide access to data. In some implementations, the data storage 208 may store data received from other elements of the system 100 including, for example, entities 120, 130, 108, and/or the data disparity engine 126, and may provide data access to these entities.

The data storage 208 may be included in the computing device 200 or in another computing device and/or storage system distinct from but coupled to or accessible by the computing device 200. The data storage 208 may include one or more non-transitory computer-readable mediums for storing the data. In some implementations, the data storage 208 may be incorporated with the memory 206 or may be distinct therefrom. The data storage 208 may be a dynamic random-access memory (DRAM) device, a static random-access memory (SRAM) device, flash memory, or some other memory devices. In some implementations, the data storage 208 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 208 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis.

The data stored by the data storage 208 may organized and queried using various criteria including any type of data stored by them, such as described herein. The data storage 208 may include data tables, databases, or other organized collections of data. Examples of the types of data stored by the data storage 208 may include, but are not limited to, the data described with respect to the figures, for example.

FIG. 3 is a block diagram illustrating a rolling join window module 122 of the observability platform 130 in accordance with some implementations. The rolling join window module 122 may include a window size configuration module 302 for managing the configuration of the rolling join window size in memory, a data buffer module

304 for generating, retrieving and/or managing the rules that specify how rolling join window data will be stored and placed in a buffer in the observability platform 130, a data comparison module 306 for generating, retrieving and/or managing comparison data, a data join module 308 for generating, performing and/or managing the relational style joins of data as output for the rolling join window module 122, a join failure detection module 310 for detecting join failures during execution of join operations, and a stream processing module 312 for managing stream processing related to the rolling join window module 122. As described above, the database 128 may be used to store data used by the rolling join window module 122 and each of its components (302, 304, 306, 308, 310, 312).

The window size configuration module 302 may include software and/or logic to provide the functionality for managing the configuration of the rolling join window size in memory, in an implementation. For example, an administrative user may determine that the window size be configured to accommodate a large number of events for batch jobs. In another example, the administrative user may configure the window size to be suitable to handle data across multiple days. As another example, the window size configuration module 302 may vary based on the query inputted by the user to handle the specific requirements of executing that query. Any number of user interface interactions may be performed by a user of the observability platform 130 to provide user input to configure the window size for the rolling join window module 122.

A data buffer module 304 may include software and/or logic to provide the functionality for generating, retrieving and/or managing the rules that specify how rolling join window data will be stored and placed in a buffer in the observability platform 130. For example, a predetermined set of rules may be installed by administrators of the observability platform 130 on how to implement a data buffer to manage data within the rolling join window in memory, in an implementation. Other rules may be programmed and/or inputted by administrators of the observability platform 130 to generate the rolling join window, in an implementation. In other implementations, configuration of the data buffer may be retrieved from a database 128 or may be supplied by a heuristic rules engine. In a further implementation, a data buffer module 304 may include a set of instructions to determine what data will be placed in a data buffer and on what timeline based on the rolling join window module 122.

A data comparison module 306 may include software and/or logic to provide the functionality for generating, retrieving and/or managing comparison data. For example, the data comparison module 306 may be configured to generate comparison data matches between the left and right sides of a relational join for data dispersed in the observability platform 130. In other implementations, the data comparison module 306 finds the match and then discards the matched data from the rolling join window in memory.

A data join module 308 may include software and/or logic to provide the functionality for generating, retrieving and/or managing the relational style joins of data as output for the rolling join window module 122. Administrators of the observability platform 130 may configure and/or generate queries (and/or pre-queries) that optimize the storage into and retrieval of data from the observability platform 130, such as using database 128. Data that is received into the observability platform 130 is processed to become highly structured data such that arbitrary queries may be executed more quickly and more optimally. This enables the fast and efficient retrieval of data from very large datasets. The data join module 308 may enable the rolling join window module 122 to perform relational style joins by storing multiple rows of data from different databases 128*a-n* into a single table because of the arbitrary queries that utilize the highly structured data stored in the database 128. Query results can be quickly analyzed and compared by the data join module 308 because the rolling join window module 122 buffers the data in memory. For example, individual data values for a particular dataset may be retrieved individually from specific files in the database 128 and placed in memory in a single table so that the data join module 308 may quickly and efficiently perform the relational style joins.

The data join module 308 may further include any functionality to join the large amounts of data stored in the observability platform 130. Because the data is stored in such a way to take advantage of the arbitrary queries in the observability platform, such as latency rate, HTTP status code, and the like, the volume of performance metric data may be quickly and efficiently analyzed, enabling the data join module 308 to subdivide a large task into smaller tasks and producing data visualizations that illustrate various predetermined queries in the observability platform 130.

A join failure detection module 310 may include software and/or logic to provide the functionality for detecting join failures during execution of join operations. Because the size of the join window is finite, traces which contain spans which are separated too widely may fail to join, because the first event exits the window before the last event has entered. Join failure detection module 310 detects this outcome by tracking unique identifiers for each trace which has been retired from the window. If a new span enters the window which is part of an already-retired trace, then the failure is recorded and can be reported to the user along with the results of the query, in an implementation.

A stream processing module 312 may include software and/or logic to provide the functionality for managing stream processing related to the rolling join window module 122. The rolling join window module 122 may be used in an event streaming use case where a continuous amount of data is being captured by the observability platform 130 and stored in distributed databases 128. A stream processor enables the execution of a single instruction across multiple data sets in parallel, in an implementation. Thus, the stream processing module 312 may include various functionalities needed to execute the rolling join window in memory in the use case of continuous data and/or event stream processing.

Figure 4:
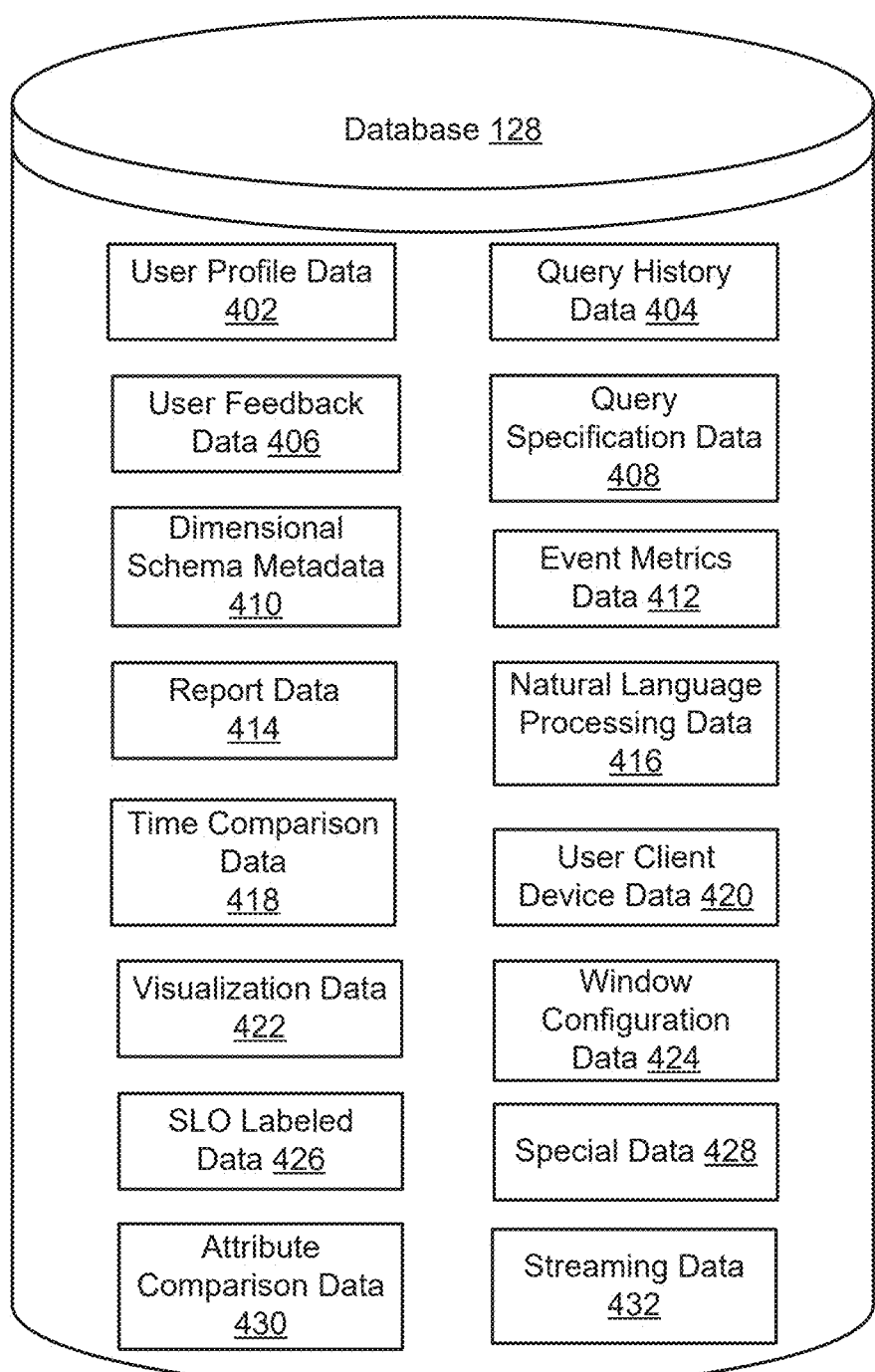
FIG. 4 is a block diagram illustrating a database of the observability platform in accordance with some implementations.

FIG. 4 is a block diagram illustrating a database 128 of the observability platform 130 in accordance with some implementations. As described above, database 128 may be instantiated in a data storage 208 in an example computing device 200 or distributed across multiple computing devices 200 across a distributed data storage 208. Database 128 may include user profile data 402 associated with users 106, query history data 404 that includes the executed queries by users 106, user feedback data 406 that is received based on the executed queries, query specification data 408 that includes the rules of what constitutes a valid query, dimensional schema metadata 410 that includes dimensional information about the database schemas associated with users 106, event metrics data 412 that is generated about various events happening on software applications being monitored by users 106 for performance monitoring purposes as measured by the observability platform 130, report data 414 generated by various functional modules of the observability platform 130, natural language processing data 416 that includes dictionaries and/or other special column names and their meaning, time comparison data 418 that includes data points representing each request in software applications being monitored by users 106, including tracing data, event based data, and time series data, user client device data 420 that includes log data and other data received from client devices 108, visualization data 422 that includes graphical data for creating data visualizations, such as bar graphs, line graphs, and the like, window configuration data 424 that includes configuration data for determining size of a join window based on the number of events in the dataset, SLO labeled data 426 that includes SLO-labeled data ("Service Level Objective" data) such as an error budget where a checkout function is operational (e.g., returns a 200) for 99% of all events over the past 2 days, special data 428 that includes data that has been marked as special by one or more algorithms and/or processes, attribute comparison data 430 generated in performing the relational style joins, and streaming data 432 that may be temporarily stored in memory while performing the relational style joins and then deleted upon completion of the in memory joins. In an implementation, data analysis query results are not stored in a database, but rather get re-generated every time the user requests them. In other implementations, data analysis query results may be stored in a data store or cache for performance enhancement purposes.

Other types of data may be stored, such as relational fields query data being included in historical query data and programmatic data that enables data analysis results to be displayed in other systems, such as email, instant messaging and chat applications. Furthermore, different user experience designs may be implemented to enable users to access the relational field data analysis function through various types of user interfaces, including a schema sidebar distribution, a specialized link and/or icon, a highlighted or otherwise differentiated tag on a query in the query builder for relational fields, and so forth. Different types of data may be stored in database 128 to support these different types of user experience designs.

Figure 5A:
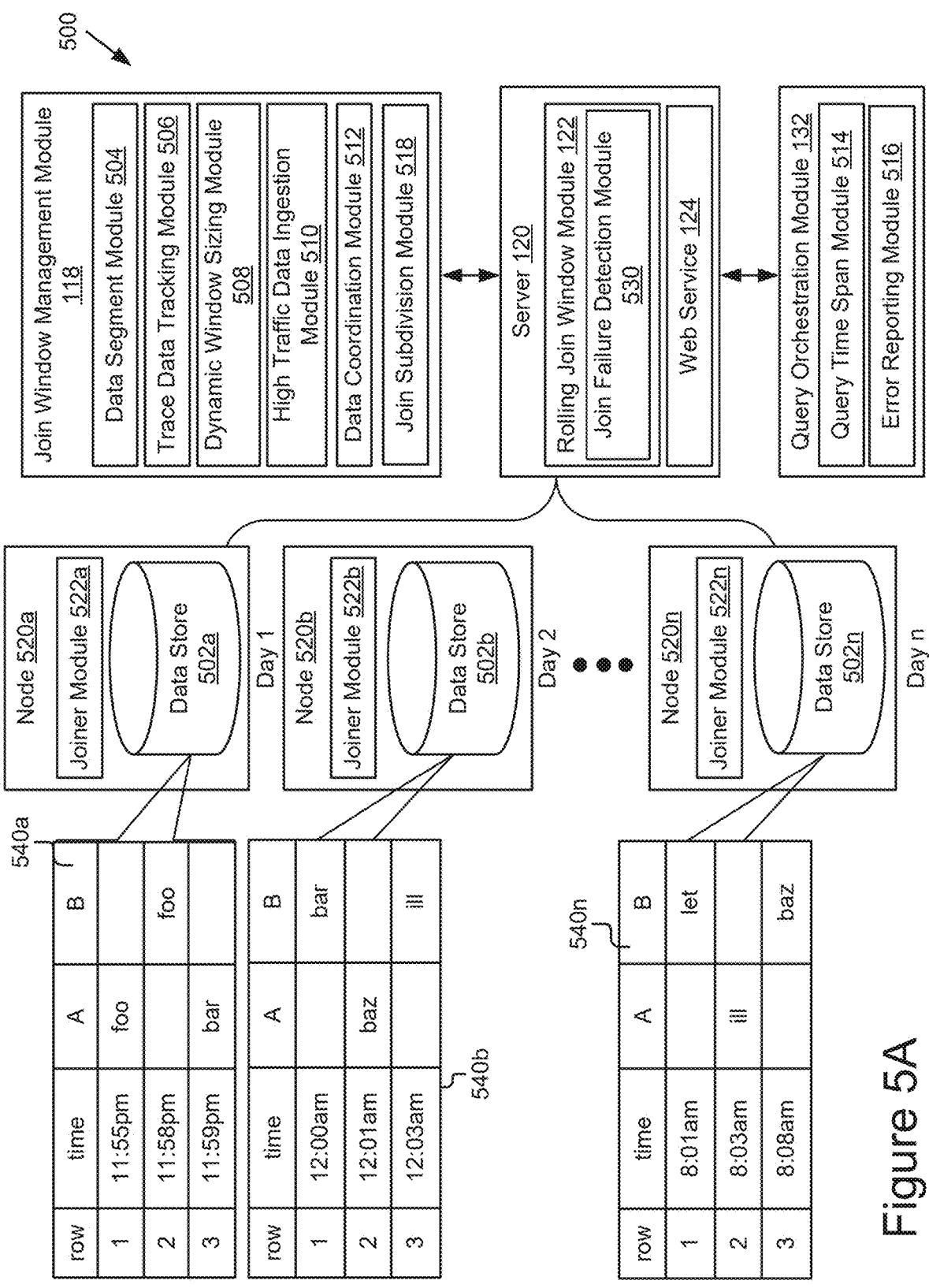
FIG. 5A is a block diagram illustrating a method of generating a rolling join window in accordance with some implementations.
Figure 5B:
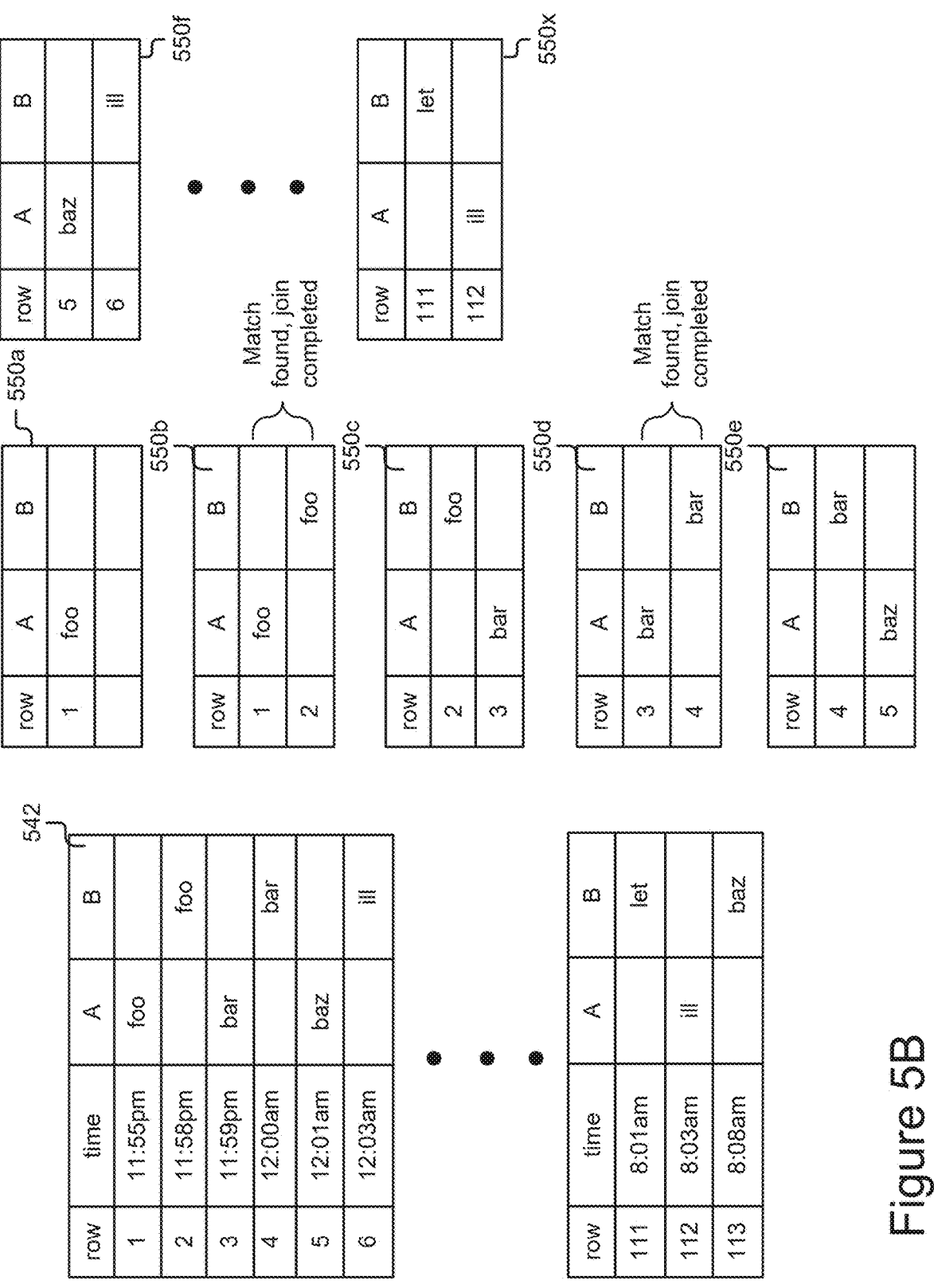
FIG. 5B is a block diagram illustrating example phases of a rolling join window in accordance with some implementations.

FIG. 5A is a block diagram illustrating a method 500 of generating a rolling join window in accordance with some implementations. FIG. 5A depicts data stores 502*a-n* within nodes 520*a-n*. Nodes 520 are shown to each have a joiner module 522. In this example, each node 520 represents a specific time period, such as day 1, day 2, ... day n. In other implementations, other time periods may be selected, such as minutes, hours, weeks, months, and years. FIG. 5B is a block diagram illustrating example phases of a rolling join window in accordance with some implementations.

FIG. 5A illustrates a join window management module 118 that includes a data segment module 504, a trace data tracking module 506, a dynamic window sizing module 508, a high traffic data ingestion module 510, a data coordination module 512, and a join subdivision module 518. A join window management module 118 may include software and/or logic to provide the functionality for managing a join window that is created based on the data analysis function of the data analysis engine 112 in the observability platform 130. Because the observability platform 130 works with real-time data that is constantly receiving updates, the join window management module 118 manages what data is being included in the join window based on data segments which may be stored in databases 502 or externally. In one embodiment, the join window management module 118 includes a time range such that only the time-bound rows are included in the join window. In this example implementation shown in FIG. 5A, the data stored at the data stores 502*a-n* include example application data where each row of data is timestamped. While not pictured in FIG. 5A, the join window may be sized based on the number of data rows in the data segments. For illustration purposes, the data segments 540 for each node 520 may be three rows in size and may be limited to the first three rows. The data segment module 504 may include software and/or logic to provide the functionality for determining a size of the in-memory rolling join window as managed by the join window management module 118. The data segment for each data store 502 are retrieved from the data stores 502 based on a request from web service 124 generated by the rolling join window module 122 on the server 120. The data segments may then be stored in memory (e.g., memory data store 114 in FIG. 1) in a single table that is processed in a rolling join window managed by the join window management module 118.

The trace data tracking module 506 may include software and/or logic to provide the functionality for managing the data segments selected from one or more different traces in the observability platform 130. For example, a query dataset may include data from multiple traces in the observability platform 130. The trace data tracking module 506 may include a unique trace identifier that is associated with the selected data segments, in an embodiment. Though not pictured, the unique trace identifier may be included as a column value in the row, for example. In this way, data from the same trace identifier may be joined, thus surfacing issues that may not have been able to be discovered without relational style joins using the in memory rolling join window.

The join window management module 118 causes the relational style joins to be performed, in an embodiment. The joined pairs are "near" each other in time, so when the table (e.g., the data segments retrieved from the data stores 502 and stored as a single table) is sorted by time, they are similarly near each other in the table. In an implementation, a join window may contain two rows at a time, such that each time a row is read, it is compared only to rows in the join window, and the join is completed whenever a match is found. For example, the data segments 540, as illustrated in FIG. 5A, may be joined in a single table. The joiner modules 522 of the nodes 520 may communicate the data segments to the rolling join window module 122, in an implementation. The single table in memory may include data segment 540a (rows 1-3 of data store 502a), data segment 540b (rows 1-3 of data store 502b), and so on until data segment 540n (rows 1-3 of data store 502n) such that row 1 from data store 502b is immediately after row 3 of data store 502a. As illustrated in FIG. 5B, a single table 542 in memory is illustrated, as well as a 2-row join window, illustrated in phases 550. Thus, the single table is processed with a 2-row join window with the following steps: 1) read row 1 (join window 550a: 1); 2) read row 2 (join window 550b: 1, 2), join rows 1 and 2, producing a result; 3) read row 3 (join window 550c: 2, 3); read row 4 (join window 550d: 3, 4), join rows 3 and 4, producing a result, and so on until there are no further rows in the single table 542. Note that row 4 of the single table 542 is row 1 from data store 502b, the right side of the join. Also illustrated are phases 550e, 550f, and 550x.

In an embodiment, a fixed number of rows is kept in memory (e.g., the "join window") in a first-in-first-out buffer. In another embodiment, the number of rows kept in memory changes based on the query results dataset. Each time a row is read, it is compared only to rows in the join window, and the join is completed whenever a match is found. The match is performed by the data analysis engine 112, in an embodiment, and the join window management module 118 determines how many rows may be kept in the join window in memory, in an implementation. For example, the dynamic window sizing module 508 may include software and/or logic to provide the functionality for determining the join window size per requested query. The dynamic window sizing module 508 may have a default join window size of 2-rows, in an implementation. The size of the join window may change based on the number of events in the query dataset, in an implementation. In one embodiment, the join window size may be configured to be the same size of a data segment, as determined by the data segment module 504.

In an implementation, the dynamic window sizing module 508 may include software and/or logic to provide functionality for generating a temporal window based on a defined time period. For example, the join window may be reserved for rows of data within the last 5 minutes. In another example, the join window may be a temporal window of under 1 minute and may be sized for the number of events that fit in the temporal window of under 1 minute. For time periods under 1 minute, there may be no lower bound to the number of rows, in an implementation. As a further example, a 15-minute time period may be used for less continuous data. The join window may include a number of rows of time-series data, or event data. Thus, the number of events may vary depending on the use cases, from user interface event streams, such as clicks and interactions with user interface elements, to large scale batch jobs with thousands and even millions of events. In an implementation, the join window may be sized on a per query basis to accommodate the different data sizes.

A high traffic data ingestion module 510 may include software and/or logic to provide the functionality for managing the data ingestion of a high traffic software application that is being monitored by one or more users 106 of the observability platform 130. For example, the software application being monitored by users 106 of the observability platform 130 may experience high traffic such that thousands of events may be generated on the software application within minutes. Thus, the high traffic data ingestion module 510 may segment the data, using the data segment module 504, into data segments that are the same size of the join window such that the processing of the relational style joins is performed more efficiently.

A data coordination module 512 may include software and/or logic to provide the functionality for coordinating the data between the nodes 520, the server 120, and the observability platform 130 over a network (e.g., network 102 of FIG. 1). For example, the data coordination module 512 may manage the transfer of data from the distributed nodes 520 that include the data stores 502 into a memory table on the observability platform 130 over the network and through server 120 via the rolling join window module 122. In an embodiment, data pointers to the locations of the data may be generated by the data coordination module 512. In another embodiment, the data coordination module 512 may track the data being selected by a unique identifier.

A join subdivision module 518 may include software and/or logic to provide the functionality for managing the data segments when subdividing a larger task into rolling join window sized data segments. For example, the configuration and execution of subdividing larger tasks into smaller tasks that can be accommodated by the rolling join window size may be managed through the join subdivision module 518 by the administrators of the observability platform 130. The join subdivision module 518 may also identify areas of overlap between subdivided tasks, where fully populating the join window for one task requires reading data also assigned to another task. In such cases, the subdivision will include instructions to the rolling join window module 122 informing it of additional segments to read and that these constitute overlap segments to be used solely for join purposes. Data segments are a property of data storage and once the data is read, the system no longer handles them in whole segments.

FIG. 5A further illustrates a server 120 having a rolling join window module 122 and a web service 124, as illustrated in FIG. 1. A rolling join window module 122 may include software and/or logic to provide the functionality for interacting with and managing the query requests of users 106. As illustrated in FIG. 5A, the query may include data from multiple databases 502, and the rolling join window module 122 may be tasked with reading rows of data from the multiple databases 502 into the memory data store 114 (e.g., as illustrated in FIG. 1) in a single table. The "join window" is "rolling" in a dynamic way, with the data table constantly changing in various ways; the join window be a fixed 2-row join window, as described above, or it may be time bound, in an implementation. Further, the join window may be sized based on the number of events in the dataset, as managed by the dynamic window sizing module 508 of the join window management module 118.

The query orchestration module 132 may interact with the rolling join window module 122 such that the data from data stores 502 are read into a memory data store 114 as a first-in-first-out buffer. The data segments may be orchestrated, in an implementation, such that a large task, such as processing thousands of events in a high trafficked software application, may be divided and distributed into smaller tasks. In this approach, each node may be given a section of the table for which it may source both left and right rows and is further given one join window's worth of data both above and below its section, from which it may source only right rows. Thus, this allows the join to be broken down into smaller parts, with a fraction of the table read by multiple nodes, ensuring that no redundant results are produced.

In another implementation, the rolling join window module 122 may implement a stream processor that examines rows as they are generated by an external source and then discards them. Traditional joins may not be possible in this scenario, but assuming streamed rows are generated in temporal order, a streaming application can maintain a join window in-memory and perform joins on the streamed data.

FIG. 5A shows a query orchestration module 132 having a query time span module 514, and an error reporting module 516. A query orchestration module 132 may include software and/or logic to provide the functionality for orchestrating a query using data divided into segments based on the data analysis request from the data analysis engine 112 in the observability platform 130, as illustrated in FIG. 1. For example, the query orchestration module 132 may identify a dataset and based on the metadata, have an awareness of what data exists. Thus, the query orchestration module 132 may define a time range, a number of events per data segment, and identify which data stores 502a-n and which data segments to select, in an implementation. The data segments that are known to the query orchestration module 132 may be timed and/or coordinated such that the query is executed in stages to accommodate the join window size to perform the relational joins in memory. The query orchestration module 132 may modify the query to incorporate this coordination and/or timing based on the query request from the query building engine 104, in an implementation.

A query time span module 514 may include software and/or logic to provide the functionality for configuring a time span that is queried, in an implementation. In one example, the query may specify a time span to limit the query dataset. In another example, where no time span is specified in the query, a default configuration may include a time span of a predetermined time period, such as the last n number of days, as stored in data stores 502a-n. In a further example, the query time span module 514 may divide a large dataset by time spans, segmenting the data using the data segment module 504.

An error reporting module 516 may include software and/or logic to provide the functionality for generating errors to be included in a report or log. For example, when a join window fails to correctly join data, an error may be generated and stored in a log for later reporting, or may be reported to the user through a user interface or API. Other examples of error reporting include when one of nodes 520 or data store 502 is not able to supply data, serverless compute resources are not available, a query takes too long or uses too much memory, a user does not have permission to run a query, or when some other error occurs during the join window execution process.

FIG. 6 is an example flowchart diagram illustrating a method 600 of generating a rolling join window in accordance with some implementations.

At 602, a request is received to perform a query in association with a dataset on an observability platform 130, the request including user input defining the query, wherein the query includes one or more filters to identify one or more spans in a trace.

At 604, the dataset is retrieved including a number of event identifiers.

At 606, a join window is generated that is dynamically sized based on the number of event identifiers in the dataset.

At 608, a list of data segments based on the retrieved dataset is generated.

At 610, the list of data segments is processed to perform, or execute, one or more relational join operations on the dataset based on the query using the join window.

At 612, a result set is generated based on the processed list of data segments.

At 614, the result set is provided as a response to the request for display on the observability platform.

FIG. 7 is an example flowchart diagram illustrating an example method of generating a rolling join window in accordance with an implementation.

At 702, a request is received to perform a query in association with a dataset on an observability platform 130, where the request includes user input defining the query, wherein the query includes one or more filters to identify one or more spans in a trace.

At 704, the dataset is retrieved including one or more event identifiers, wherein the dataset is distributed across a plurality of nodes.

At 706, a join window is generated that is dynamically sized based on the number of event identifiers in the dataset.

At 708, a list of data segments is generated based on the retrieved dataset and the plurality of nodes.

At 710, the plurality of nodes process the list of data segments to perform, or execute, one or more relational join operations on the dataset based on the query using the join window.

At 712, a result set is generated based on the processed list of data segments.

At 714, the result set is provided as a response to the request for display on the observability platform.

FIG. 8 is an example flowchart diagram illustrating a method of performing (e.g., executing) a plurality of join operations using an in-memory rolling join window in accordance with some implementations.

At 802, a request is received via a user interface to perform a query in association with a dataset on an observability platform 130.

At 804, a list of data segments is generated for the dataset based on the request.

At 806, a plurality of join operations on the list of data segments for the dataset is executed (e.g., performed) based on identified one or more join key values in the query using an in-memory rolling join window. Join key values may include attributes of the data that match in a relational style join.

At 808, a decision point evaluates whether a result dataset from the executed plurality of join operations includes data segments from a neighboring node. If yes, then the method 800 continues to step 810. If not, then the method 800 skips to step 812.

At 810, the data segments from the neighboring node are read into memory as part of the rolling join window. The method 800 then continues to step 806.

At 812, a response to the request for display in the user interface on the observability platform 130 is generated based on the result dataset. After step 812, the method ends.

Figure 9:
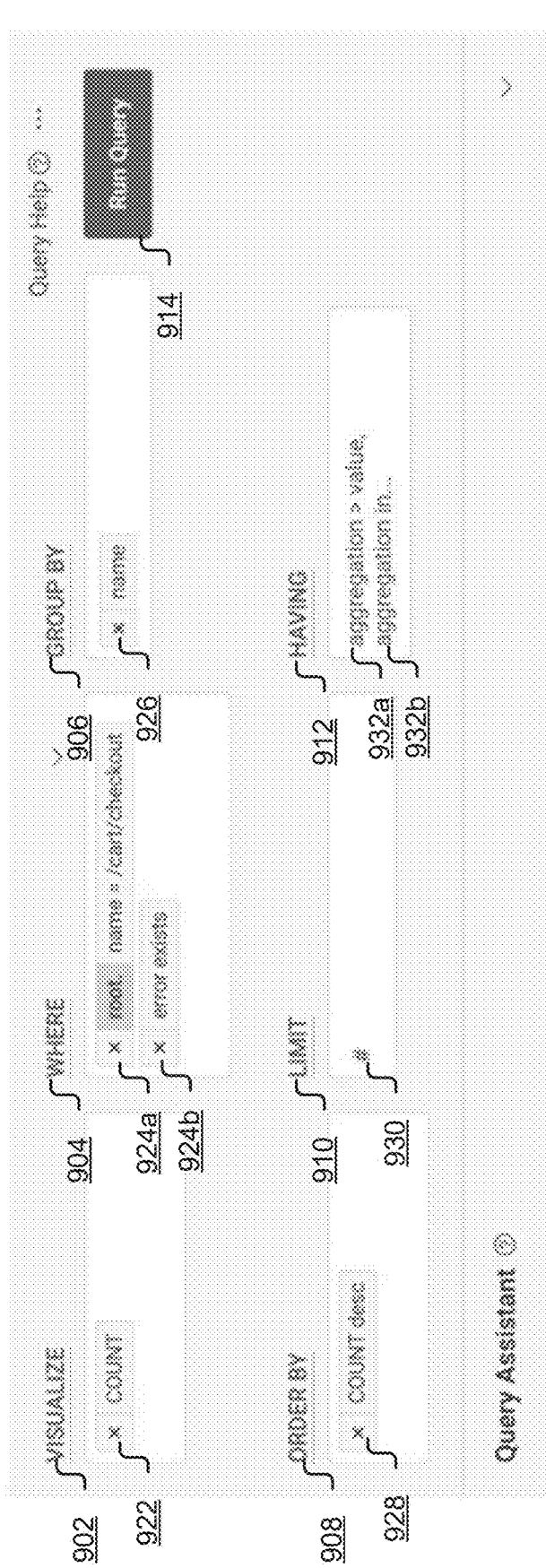
FIG. 9 is an example screenshot illustrating an example querying user interface of the observability platform in accordance with an implementation.

FIG. 9 is an example screenshot illustrating an example querying user interface 900 of the observability platform 130 in accordance with an implementation. The query building user interface 900 includes various user input fields that enable a user to build a query without the need for correct syntax and/or formatting. For example, the query building user interface 900 includes a "VISUALIZE" input field 902, a "WHERE" input field 904, a "GROUP BY" input field 906, an "ORDER BY" input field 908, a "LIMIT" input field 910, and a "HAVING" input field 912. The user may input data values into the input fields that are specific to the input field. For example, the user may input "COUNT" as user input 922 into the "VISUALIZE" input field 902 to generate a graph that visualizes a count of the result data. The user may input "root. name=/cart/checkout" as user input 924*a* into the "WHERE" input field 904 to add a filter that limits the results to spans in under the "root" span where the name is "/cart/checkout/". The "root." input value may be highlighted in a particular color, such as blue, to signify that a relational field, or special field, is being inputted as user input. The user may also add "error exists" as user input 924*b* in the "WHERE" input field 904. Because there are two user inputs 924, the "WHERE" clause implies an "AND" between the two filters. Thus, this would generate results to spans in under the "root" span where the name is "/cart/checkout/" and spans where an error exists. The user may then add "name" as user input 926 to the "GROUP BY" input field 906 to group the results by the name column. The user may then input "COUNT desc" as user input 928 to the "ORDER BY" input field 908 to create a sorting of the results by the count description. A user may wish to enter a maximum number of results, or a limit value, as user input 930 in the "LIMIT" input field 910. In this example, no limit value has been entered. The user may also include various user input 932 in the "HAVING" input field 912, such as "aggregation>value" user input 932*a* and "aggregation in . . ." user input 932*b* that may be inputted in a separate dialog box not illustrated. The user input 932 may indicate additional filters or criteria that the user wants to specify to further narrow the results from the query. The "Run Query" button 914 may be selected by the user to execute the query.

Figure 10:
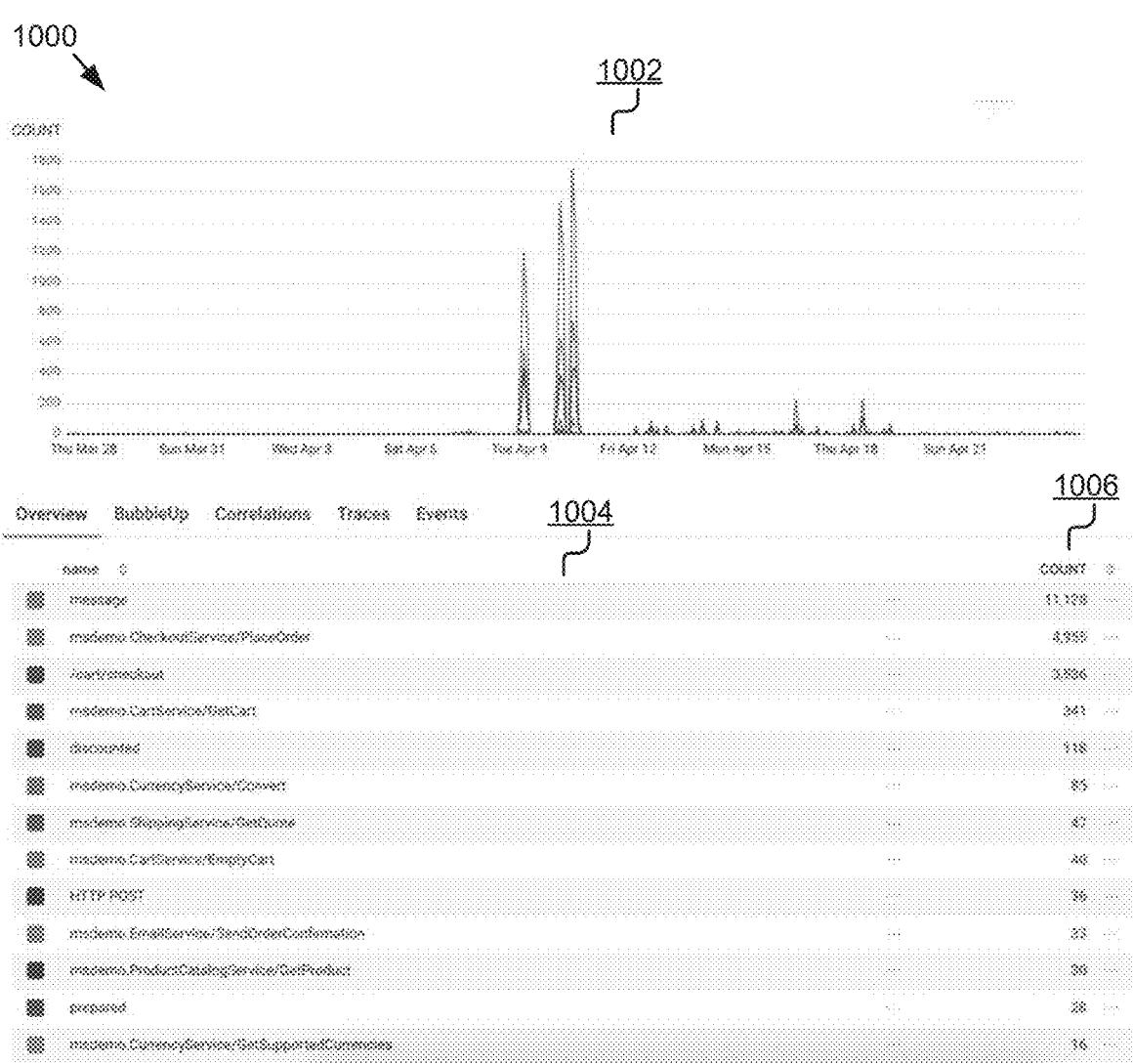
FIG. 10 is an example screenshot illustrating an example query results user interface of the observability platform in accordance with an implementation.

FIG. 10 is an example screenshot illustrating an example query results user interface 1000 of the observability platform 130 in accordance with an implementation. Data visualization element 1002 includes an example chart visualization of the query results as a set of overlapping line graphs that are color-coded. As further displayed in the tabular data visualization element 1004, a set of tabs for different user interactions with datasets in the observability platform 130, including an "Overall" tab, a "BubbleUp" tab, a "Correlations" tab, a "Traces" tab, and an "Events" tab. Each of the tabs is presented in the user interface 1000 as selectable links that retrieves different data visualizations and/or pre-determined queries in the observability platform 130 on the database 128, for example.

The tabular data visualization element 1004 depicts the query results of the query executed in FIG. 9, listing "name" data values along the left hand side with associated colors as illustrated in the line graph data visualization in element 1002, specifically showing "message" in purple, illustrating a line graph data visualization in user interface element 1002 showing a Count of errors in which data points are plotted as lines across a y-axis of COUNT that increases by 200 upwards to 1800, and across an x-axis of Dates from Thursday March 28 to Sunday April 21 in three day increments. The lines are color-coded for the different names, such as purple for "message," orange for "msdemo.CheckoutService/PlaceOrder," blue for "/cart/checkout," and green for "msdemo.CartService/GetCart," as illustrated in tabular user interface element 1004, among other data values. The line graph data visualization interface 1002 is selectable such that a portion of the line graph can be selected by a user 106, in an implementation.

FIG. 10 illustrates an example error rate data visualization user interface 1002, showing a series of lines visualized over a period of days that are color coded according to the "name" and ordered by the COUNT. In the table user interface element 1004, data may be shown by each "name," such as 11,128 counted errors, as indicated in the "COUNT" column 1006. These errors were surfaced based on the relational style joins in the rolling join window as implemented and described above.

Figure 11:
FIG. 11 is an example screenshot illustrating an example data visualization user interface of the observability platform in accordance with an implementation.

FIG. 11 is an example screenshot illustrating an example data visualization user interface 1100 of the observability platform in accordance with an implementation. User interface trace summary element 1102 depicts an informational statement that summarizes the data being shown, such as "47 spans at Apr. 16 2024 22:43:32 UTC-07:00 (4.309 s)," that enables a user 106 to quickly understand the data being presented to navigate through the 47 spans through different data visualizations and/or datasets. The data visualization user interface 1100 illustrates the "Span with errors (1)" button 1104, including a number of errors highlighted in a different color, such as red. Table 1106 of the data visualization user interface 1100 includes a hierarchical display of the spans, starting with the root. span as described in the query executed in FIG. 9. Specifically, the "/cart/checkout/" span is listed in the first row of the table 1106 with connected lines in a hierarchical manner to the rows below. Deeply nested in the table 1106 is row 1108 that is highlighted as a span that includes an error. The row 1108 of the data visualization user interface 1100 may be highlighted to enable the user to quickly identify the specific span that includes the error as executed in FIG. 9, showing that "HTTP POST" in the "shipping" service.name included a duration_ms data value of "3647.209976," which is also highlighted in red and graphed in the last column as a time span of 3.647 seconds. This clearly shows to the user 106 that this specific span is a root cause of the slowdown being experienced in the "/cart/checkout" span that shows a total time span of 4.309 seconds in the first row of the table 1106. Thus, the data visualization user interface 1100 beneficially illustrates the data results of the query that is implemented using the rolling join window as described herein.

Figure 12A:
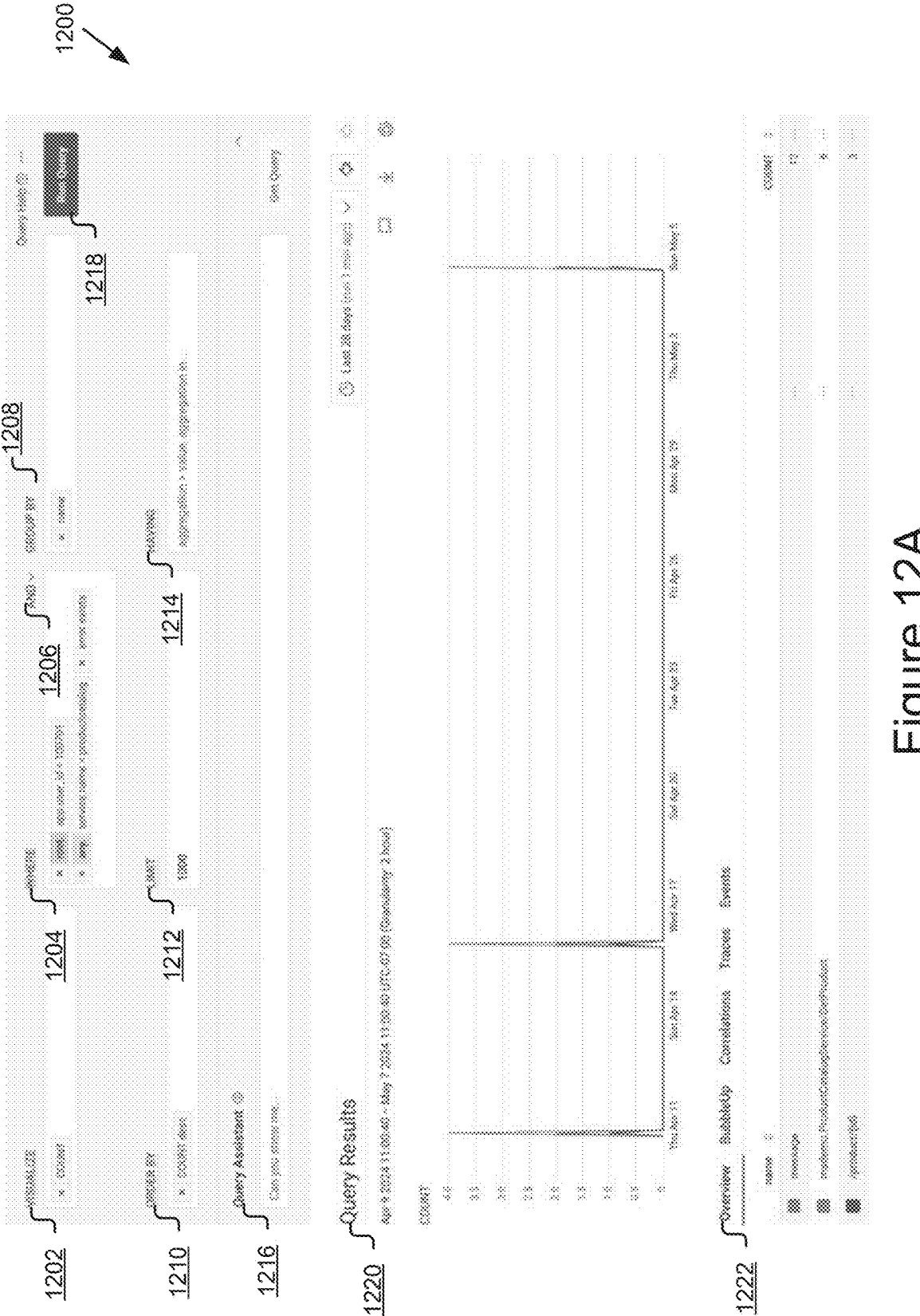
FIG. 12A is an example screenshot illustrating an example querying user interface and query results user interface of the observability platform in accordance with an implementation.

FIG. 12A is an example screenshot illustrating an example querying user interface 1200 and query results user interface 1220 of the observability platform 130 in accordance with an implementation. A user 106 may input various data values into the querying user interface 1200, similar to FIG. 9, such as a "COUNT" data value in the "VISUALIZE" input field 1202, "root.app.user_id=100701," "any. service.name=productcatalog," and "error exists" in the "WHERE" input field 1204, selecting the "AND" option in the querying user interface element 1206, "name" in the "GROUP BY" input field 1208, "COUNT desc" in the "ORDER BY" input field 1210, inputting "1000" in the "LIMIT" input field 1212, and "aggregation>value, aggregation in . . . " in the "HAVING" input field 1214. In an implementation, a Query Assistant user interface 1216 may be used to use natural language understanding models to generate the query for execution. Once the query is inputted by the user 106, the "Run Query" button 1218 may be selected to execute the query. In this example, the query inputted by the user 106 is visualizing a count of the errors in the "root." span of app.user_id=100701, a specific application, where "any." span with "service.name=productcatalog" exists with an error. The query results are limited to 1000 results. The query results user interface 1220 illustrates a line graph data visualization, showing a peak of a purple line with a COUNT of 4.0 just before Thursday April 11, another peak of the same purple line with a COUNT of 4.0 shortly before Wednesday April 17, and a further peak of the same purple line with a COUNT of 4.0 shortly before Sunday May 5. Additionally, other line graphs are illustrated, including an orange line and a blue line that each peak with a COUNT of 2.0 and 1.0, respectively on the same dates as the purple line. The tabular data visualization user interface 1222 shows a "message" data value, associated with the purple line, with a COUNT of 12, a "msdemo.ProductCatalogService/GetProduct" data value, associated with the orange line, with a COUNT of 6, and a "/product/{id}" data value, associated with the blue line, with a COUNT of 3. Thus, these query results show the errors that were found in the data set, as found through the use of the rolling join window as described herein.

Figure 12B:
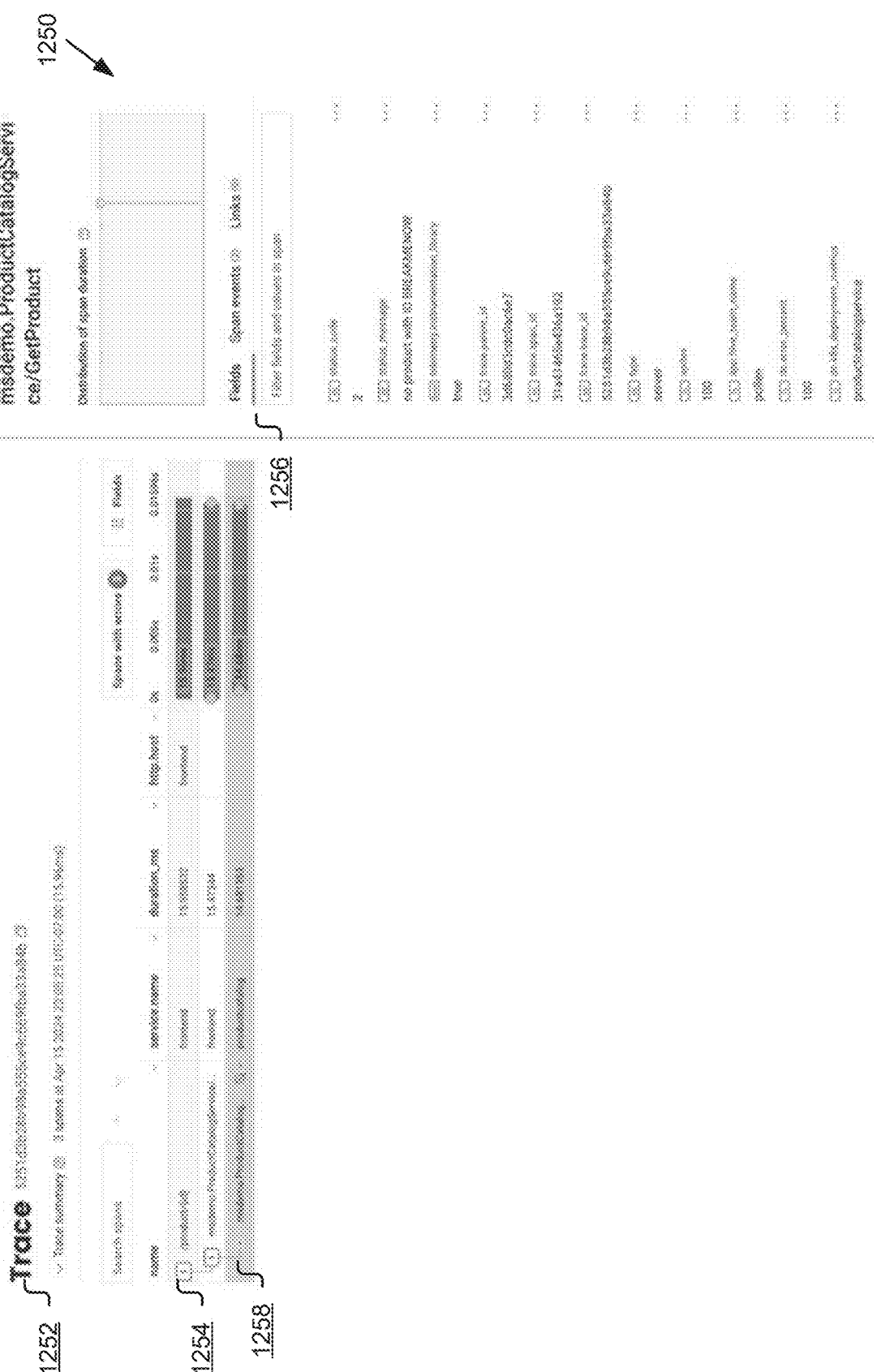
FIG. 12B is an example screenshot illustrating an example data visualization user interface of the observability platform in accordance with an implementation.

FIG. 12B is an example screenshot illustrating an example data visualization user interface 1250 of the observability platform 130 in accordance with an implementation. Continuing the example query of FIG. 12A, the example data visualization user interface 1250 is shown to the user upon selecting the "Traces" tab of the tabular data visualization user interface 1222 in FIG. 12A. A selectable trace data visualization 1252 is shown within the user interface 1250, including a Trace summary statement informing the user that the data being presented includes 3 spans at Apr. 15 2024 23:05:25 UTC-07:00 (15.96 ms). Similar to FIG. 11, the trace data visualization 1252 includes a first row 1254 of the trace hierarchy. Here, "/product/{id}" is included in the first row 1254 of the trace data visualization 1252, showing that it took 15.958532 milliseconds to perform the service request. Further nested in the trace diagram, "msdemo.ProductCatalog . . . " in the third row 1258 is highlighted as being selected by the user 106 investigating the errors in the spans. Upon selecting the third row 1258, a detailed view 1256 of the selected span may be shown in a side portion of the user interface 1250, including the full name of the span, "msdemo.ProductCatalogService/GetProduct" and other information available. As can be seen in the detailed view 1256, the "app.hive_team_name" listed for the span is "pollen," meaning that the team responsible for fixing the errors found is known.

In other implementations, a data analysis function may implement a rolling join window as described above in various other contexts, such as other use cases where a rolling join window may benefit users of the observability platform 130. For example, joining data across a distributed data system may similarly use a rolling join window that divides the task into data segments such that each data segment is the size of one join window. Though not illustrated in the Figures, the functionality of the user interfaces shown in FIGS. 9-12B and described above are similar. Other visual presentations may be used for results, such as donut charts for low cardinality, text lists for fields like TraceID, line charts for continuous values, using different color schemes, enabling the query to be executed from a multitude of starting points, such as a separate tab, a link to a current result view, from any heatmap visualization, in response to a user wishing to execute a query, and so forth.

In some implementations, a column sometimes is defined on few items. "Null" is therefore a value for some of the items. "Null" values are not included in aggregate results, but can be used as search criteria.

It should be understood that other processors, operating systems, sensors, displays, and physical configurations are possible.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

In some instances, various implementations may be presented herein in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code, such as the computing systems, entities, and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus specially constructed for the required purposes, or it may comprise a general-purpose computer selectively activated or reconfigured by a computer program stored in the computer.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layers, transport layers, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:

receiving a request to perform a query in association with a dataset on an observability platform, the request including user input defining the query, wherein the query includes one or more filters to identify one or more spans in a trace;

retrieving the dataset including a number of event identifiers based on the one or more spans identified in the trace, the dataset comprising a plurality of events having associated timestamps, wherein the dataset is distributed across a plurality of nodes, each node having a data store;

generating a join window that is dynamically sized based on the number of event identifiers in the dataset;

generating a list of data segments based on the retrieved dataset, each data segment comprising a number of data rows retrieved from the data store of a node from the plurality of nodes;

storing each data segment from the list of data segments in a single table:

using the join window, processing the list of data segments stored in the single table by reading each data row of the single table into the join window to perform one or more relational join operations on the dataset based on the one or more filters in the query, wherein a join is completed whenever a match is found by comparing the data row being read to other data rows in the join window;

generating a result set comprising completed joins based on the processed list of data segments; and providing the result set as a response to the request for display on the observability platform.

2. The computer-implemented method of claim 1, the method further comprising:

sorting the list of data segments stored in the single table based on the associated timestamps of the plurality of events; and executing the one or more relational join operations on the dataset upon processing the sorted list of data segments to perform the query.

3. The computer-implemented method of claim 2, further comprising:

determining one or more executed join operations includes particular data segments from a neighboring node; and retrieving the particular data segments from the neighboring node into memory as part of the join window.

4. The computer-implemented method of claim 1, wherein the one or more relational join operations are performed in memory on the list of the data segments for the dataset based on identified one or more join key values in the query using the join window.

5. The computer-implemented method of claim 1, wherein the one or more relational join operations are performed using an application programming interface call to a web service communicatively coupled to a data analysis engine.

6. The computer-implemented method of claim 1, wherein the result set of the query comprises a plurality of data values that detail the one or more spans in the trace based on the one or more filters in the query.

7. The computer-implemented method of claim 5, wherein providing the result set as the response to the query comprises:

generating a user interface comprising a plurality of data visualizations of the result set, the user interface generated on the observability platform;

receiving a selection of one of a plurality of data values in the user interface on the observability platform; and providing for display in the user interface the one or more spans in the trace based on the selection.

8. A system comprising one or more processors and memory operably coupled with the one or more processors, wherein the memory stores instructions that, in response to execution of the instructions by one or more processors, cause the one or more processors to perform operations including:

receiving a request to perform a query in association with a dataset on an observability platform, the request including user input defining the query, wherein the query includes one or more filters to identify one or more spans in a trace;

retrieving the dataset including a number of event identifiers based on the one or more spans identified in the trace, the dataset comprising a plurality of events having associated timestamps, wherein the dataset is distributed across a plurality of nodes, each node having a data store;

generating a join window that is dynamically sized based on the number of event identifiers in the dataset;

generating a list of data segments based on the retrieved dataset, each data segment comprising a number of data rows retrieved from the data store of a node from the plurality of nodes;

storing each data segment from the list of data segments in a single table:

using the join window, processing the list of data segments stored in the single table by reading each data row of the single table into the join window to perform one or more relational join operations on the dataset based on the one or more filters in the query, wherein a join is completed whenever a match is found by comparing the data row being read to other data rows in the join window;

generating a result set comprising completed joins based on the processed list of data segments; and providing the result set as a response to the request for display on the observability platform.

9. The system of claim 8, wherein the operations further comprise:

sorting the list of data segments stored in the single table based on the associated timestamps of the plurality of events; and executing the one or more relational join operations on the dataset upon processing the sorted list of data segments to perform the query.

10. The system of claim 9, wherein the operations further comprise:

determining one or more executed join operations includes particular data segments from a neighboring node; and retrieving the particular data segments from the neighboring node into memory as part of the join window.

11. The system of claim 8, wherein the one or more relational join operations are performed in memory on the list of the data segments for the dataset based on identified one or more join key values in the query using the join window.

12. The system of claim 8, wherein the one or more relational join operations are performed using an application programming interface call to a web service communicatively coupled to a data analysis engine.

13. The system of claim 8, wherein the result set of the query comprises a plurality of data values that detail the one or more spans in the trace based on the one or more filters in the query.

14. The system of claim 13, wherein providing the result set as the response to the query comprises:

generating a user interface comprising a plurality of data visualizations of the result set, the user interface generated on the observability platform;

receiving a selection of one of the plurality of data values in the user interface on the observability platform; and providing for display in the user interface the one or more spans in the trace based on the selection.

15. A non-transitory computer-readable storage media storing one or more sequences of instructions which, when executed using one or more processors, cause the one or more processors to execute a method comprising:

receiving a request to perform a query in association with a dataset on an observability platform, the request including user input defining the query, wherein the query includes one or more filters to identify one or more spans in a trace;

retrieving the dataset including a number of event identifiers based on the one or more spans identified in the trace, the dataset comprising a plurality of events having associated timestamps, wherein the dataset is distributed across a plurality of nodes, each node having a data store;

generating a join window that is dynamically sized based on the number of event identifiers in the dataset;

generating a list of data segments based on the retrieved dataset, each data segment comprising a number of data rows retrieved from the data store of a node from the plurality of nodes;

storing each data segment from the list of data segments in a single table:

using the join window, processing the list of data segments stored in the single table by reading each data row of the single table into the join window to perform one or more relational join operations on the dataset based on the one or more filters in the query, wherein a join is completed whenever a match is found by comparing the data row being read to other data rows in the join window;

generating a result set comprising completed joins based on the processed list of data segments; and providing the result set as a response to the request for display on the observability platform.

16. The non-transitory computer-readable storage media of claim 15, wherein the method further comprises:

sorting the list of data segments stored in the single table based on the associated timestamps of the plurality of events; and executing the one or more relational join operations on the dataset upon processing the sorted list of data segments to perform the query.

17. The non-transitory computer-readable storage media of claim 16, wherein the method further comprises:

determining one or more executed join operations includes particular data segments from a neighboring node; and retrieving the particular data segments from the neighboring node into memory as part of the join window.

18. The non-transitory computer-readable storage media of claim 15, wherein the one or more relational join operations are performed on the list of the data segments for the dataset based on identified one or more join key values in the query using the join window in-memory.

19. The non-transitory computer-readable storage media of claim 18, wherein the result set of the query comprises a plurality of data values that detail the one or more spans in the trace based on the one or more filters in the query.

20. The non-transitory computer-readable storage media of claim 15, providing the result set as the response to the query comprises:

generating a user interface comprising a plurality of data visualizations of the result set, the user interface generated on the observability platform;

receiving a selection of one of a plurality of data values in the user interface on the observability platform; and providing for display in the user interface the one or more spans in the trace based on the selection.

\* \* \* \* \*